US012677260B1

(12) United States Patent
Rofougaran et al.

(10) Patent No.: US 12,677,260 B1
(45) Date of Patent: **\*Jul. 7, 2026**

(54) SYSTEM AND METHOD FOR DISTRIBUTED SPECTRUM MONITORING

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/411,461

(22) Filed: Dec. 8, 2025

Related U.S. Application Data

(63) Continuation of application No. 19/330,886, filed on Sep. 17, 2025, now Pat. No. 12,520,289.

(51) Int. Cl.
*H04W 72/0446* (2023.01)
*H04W 76/15* (2018.01)

(52) U.S. Cl.
CPC ....... *H04W 72/0446* (2013.01); *H04W 76/15* (2018.02)

(58) Field of Classification Search
CPC .......................... H04W 72/0446; H04W 76/15
See application file for complete search history.

(56) References Cited

U.S. PATENT DOCUMENTS

2025/0168911 A1* 5/2025 Gan .................. H04W 52/0216
2025/0301518 A1* 9/2025 Naik ..................... H04W 76/14

FOREIGN PATENT DOCUMENTS

EP       0613276 B1 * 2/1996 ........... H04L 7/0008

OTHER PUBLICATIONS

Notice of Allowance for U.S. Appl. No. 19/330,886, dated Oct. 27, 2025.

* cited by examiner

*Primary Examiner* — Farid Seyedvosoghi
(74) *Attorney, Agent, or Firm* — CHIP LAW GROUP

(57) ABSTRACT

A system for distributed spectrum monitoring includes a central cloud server that obtains multi-link operation (MLO) data streams from a plurality of wireless communication devices distributed across a plurality of different spatial locations. Each wireless communication device of the plurality of wireless communication devices is configured to concurrently operate at a plurality of different predetermined intermediate frequency bands. The central cloud server includes a processor that synchronizes the obtained MLO data streams from the plurality of wireless communication devices distributed across the plurality of different spatial locations. The processor further performs a cross-correlation between the synchronized MLO data streams and causes the plurality of wireless communication devices to maintain a synchronized timing reference across the plurality of wireless communication devices.

20 Claims, 7 Drawing Sheets

_300_

CENTRAL CLOUD SERVER
102

NETWORK INTERFACE
304

PRIMARY STORAGE 306

Sensing Information 308

MLO Data Streams Cache
Manager 310

Coordinated Multi-band
Signal Patterns Analyzer 312

Global Pattern Recognition
Database 314

PROCESSOR
302

CLOUD ANN MODEL 316

400

Obtain multi-link operation (MLO) data streams from a plurality of wireless communication devices distributed across a plurality of different spatial locations, wherein each wireless communication device of the plurality of wireless communication devices is configured to concurrently operate at a plurality of different predetermined intermediate frequency bands 402

↓

Synchronize the obtained MLO data streams from the plurality of wireless communication devices distributed across the plurality of different spatial locations 404

↓

Perform a cross-correlation between the synchronized MLO data streams 406

Determine phase relationships between signals detected in the plurality of different predetermined intermediate frequency bands across the plurality of wireless communication devices for the cross-correlation 406A

↓

Cause the plurality of wireless communication devices to maintain a synchronized timing reference across the plurality of wireless communication devices 408

↓

Determine relative timing offsets based on known distances between the plurality of wireless communication devices 410

↓

Merge correlation results associated with the cross-correlation between the synchronized MLO data streams based on the determined relative timing offsets 412

↓

SYSTEM AND METHOD FOR DISTRIBUTED SPECTRUM MONITORING

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 19/330,886, filed on Sep. 17, 2025. The above referenced application is hereby incorporated herein by reference in its entirety.

FIELD OF TECHNOLOGY

Certain embodiments of the disclosure relate to wireless communication devices and spectrum monitoring systems. More specifically, certain embodiments of the disclosure relate to a system and a method for distributed spectrum monitoring.

BACKGROUND

The rapid growth of wireless communication technologies and the increasing demand for high-bandwidth applications have led to significant challenges in the current spectrum management landscape. It is known that radio monitoring is the basis of spectrum management. Spectrum monitoring helps spectrum regulators plan, allocate, use and reuse frequencies, avoid incompatible usage, and identify sources of harmful interference. Spectrum monitoring has become a challenging problem due to the growing number of spectrum uses. Equipment such as spectrum analyzers are useful tools for analyzing and monitoring radio frequency (RF) signals. These instruments are useful for wireless communications testing, ensuring regulatory compliance, and troubleshooting RF interference. Spectrum analyzers play useful roles in RF design, testing, and electronic circuit development. Conventional spectrum analyzers, while effective to a certain extent, face several limitations. Currently, there are many technical challenges in effective spectrum monitoring and signal analysis across multiple frequency bands in increasingly congested electromagnetic environments. For example, high-end analyzers capable of monitoring frequencies up to 80+ GHz can cost between $1-2 million per unit, with even lower frequency models (4-5 GHz) ranging from $15,000-50,000. This significant cost barrier prevents widespread deployment of spectrum monitoring systems, particularly in applications requiring multiple monitoring points.

Current spectrum analysis solutions generally fall into two categories: swept and real-time analyzers. Swept analyzers operate by sequentially scanning frequency ranges, introducing deadtime between sweeps that can miss intermittent signals. Real-time analyzers offer faster acquisition but require complex and expensive hardware for simultaneous Fast Fourier Transform (FFT) processing. Both approaches typically demand dedicated hardware for different frequency bands, further increasing system complexity and cost. These limitations become particularly problematic in modern wireless environments characterized by, for example: (a) increasing spectrum congestion from proliferating wireless devices; (b) growing deployment of autonomous systems requiring reliable communication; (c) need for reliable interference detection and mitigation; (d) requirements for spatial awareness and signal source location; and (e) complex signal environments requiring advanced pattern recognition. With conventional systems, while traditional software-defined radio (SDR) solutions offer more flexibility, they often have restricted frequency spans and insufficient processing capability for advanced signal analysis. Additionally, conventional analyzers struggle with limited spatial awareness, making it difficult to locate and characterize signal sources in complex environments. In another example, there is a form factor constraint with traditional systems used for spectrum monitoring. Traditional benchtop units require significant space whole portable units sacrifice functionality for mobility.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A system and a method for distributed spectrum monitoring, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 4A, 4B, and 4C collectively, is a flowchart of a method for distributed spectrum monitoring, in accordance with an embodiment of the disclosure.

DETAILED DESCRIPTION OF THE DISCLOSURE

Figure 1A:
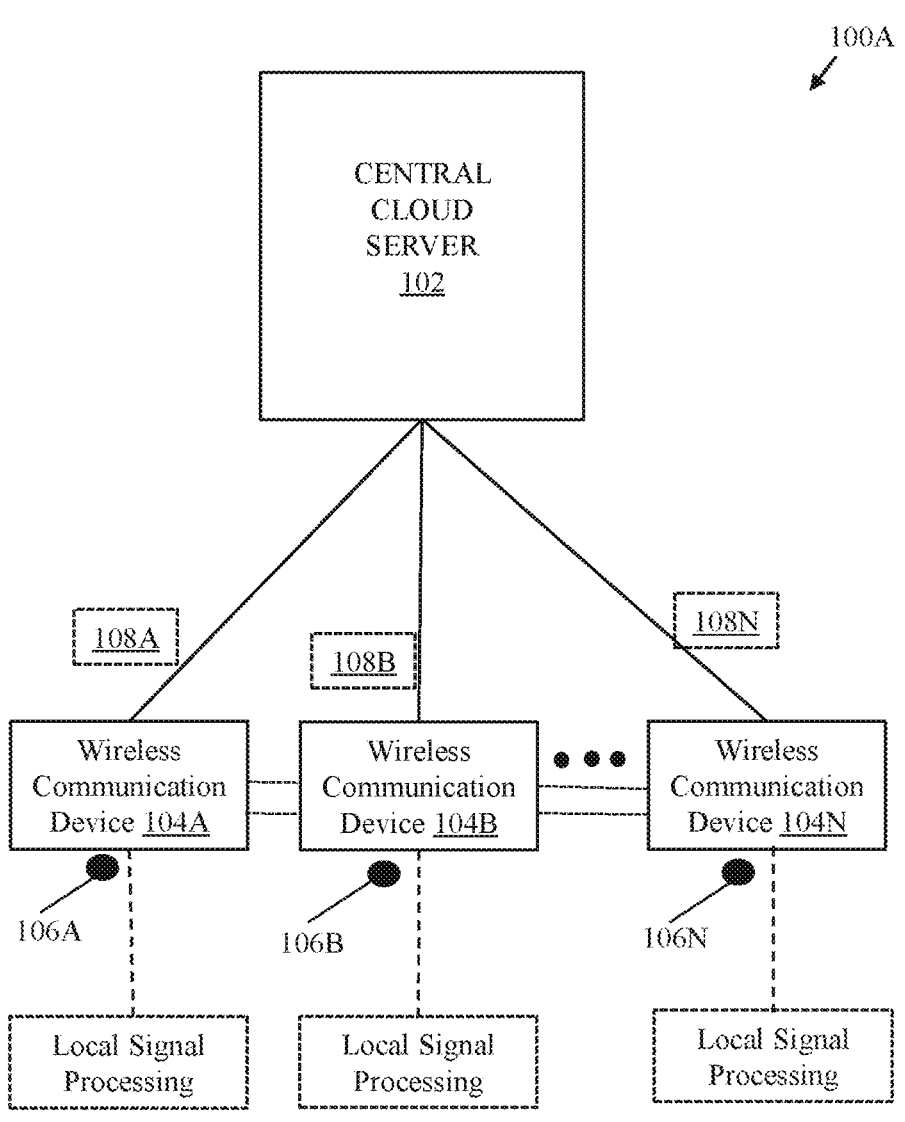
FIG. 1A is a diagram that illustrates an exemplary system for distributed spectrum monitoring, in accordance with an exemplary embodiment of the disclosure.

Certain embodiments of the disclosure may be found in a system and a method for distributed spectrum monitoring.

Traditional approaches typically rely on independent monitoring stations that analyze signals in isolation, making it difficult to detect sophisticated patterns like frequency hopping or spatially coordinated transmissions. Additionally, these systems struggle with timing synchronization across distributed locations, leading to missed detections of coordinated interference patterns and reduced monitoring effectiveness. Further, conventional systems manifest hardware complexity, such as multiple dedicated radio frequency (RF) front ends for different frequency bands, expensive analog to digital converters (ADCs) for high-bandwidth signal capture (e.g., >7 GHz), and complex signal processing hardware driving high spectrum analyzer costs. Additionally, conventional devices struggle with limited spatial awareness, making it difficult to locate and characterize signal sources in complex environments.

In contrast to conventional systems that analyze signals independently at each monitoring location, the disclosed distributed spectrum monitoring system achieves enhanced pattern detection through synchronized analysis of multi-link operation (MLO) data streams from multiple wireless communication devices distributed across different spatial locations. The disclosed system includes a central cloud server that may act as a fusion center, enabling real-time processing of MLO data streams from wireless communication devices distributed across different spatial locations. The MLO data streams may be concurrent data flows that may come from multiple wireless communication devices. Each of such wireless communication devices may include a WLAN chipset (e.g., Wi-Fi® 7 chipset) that can perform concurrent communication across multiple frequency bands (e.g., 2.4 GHz, 5 GHz, and 6 GHz)). Further, the system's central cloud server enables coordination across these distributed wireless communication devices, allowing concurrent operation across multiple predetermined intermediate frequency bands while maintaining precise timing synchronization. This synchronized multi-band operation provides comprehensive visibility into coordinated signal patterns that would appear unrelated when monitored by traditional single-location or single-band systems.

In an example, the disclosed system intelligently exploits Wi-Fi® 7's Multi-Link Operation (MLO) capability in a distributed architecture for cost-effective spectrum monitoring. By utilizing the inherent ability of Wi-Fi® 7 chipset (WLAN chipset in each wireless communication device) to concurrently operate across multiple frequency bands, the system achieves sophisticated monitoring capabilities without requiring expensive dedicated spectrum analysis equipment. Furthermore, while conventional systems can only detect signal patterns at individual locations, the disclosed system's cross-correlation capabilities enable detection of sophisticated coordinated multi-band signal patterns that exist simultaneously across multiple spatial locations. By synchronizing MLO data streams and performing cross-correlation analysis, the system can identify complex patterns such as distributed frequency hopping or coordinated interference that would be invisible to traditional monitoring approaches. This capability, combined with the system's distributed architecture, provides unprecedented visibility into sophisticated signal patterns across both frequency and spatial domains, enabling detection of advanced threats that would evade conventional monitoring systems. The system achieves this enhanced detection capability while leveraging existing wireless communication hardware for local processing, eliminating the need for costly specialized monitoring equipment at each location.

FIG. 1A is a diagram that illustrates an exemplary system for distributed spectrum monitoring, in accordance with an exemplary embodiment of the disclosure. With reference to FIG. 1A, there is shown a system 100A for enhanced distributed spectrum monitoring. The system 100A may include a central cloud server 102, a plurality of wireless communication devices, such as wireless communication devices 104A, 104B, . . . , 104N. The plurality of wireless communication devices, such as the wireless communication devices 104A, 104B, . . . , 104N may be distributed across a plurality of different spatial locations, such as spatial locations 106A, 106B, . . . 106N. The central cloud server 102 may be configured to obtain multi-link operation (MLO) data streams 108A, 108B, . . . , 108N from the plurality of wireless communication devices. Each of the wireless communication devices 104A, 104B, . . . , 104N may perform local signal processing.

In another implementation, each of the wireless communication devices 104A, 104B, . . . , 104N may function independently as a standalone device for enhanced spectrum monitoring across multiple frequency bands or may work in cooperation with each other for not only enhanced spectrum monitoring across multiple frequency bands but also wireless data communication.

The central cloud server 102 includes suitable logic, circuitry, and interfaces that may be configured to communicate with the wireless communication devices 104A, 104B, . . . , 104N (may also be referred to as network nodes or mesh nodes). In an implementation, the central cloud server 102 may be communicatively coupled to each network node and may also be referred to as a data fusion center. In an example, the central cloud server 102 may be a remote management server that is managed by a third party different from the service providers associated with the plurality of different wireless carrier networks (WCNs), service providers or spectrum owners. In another example, the central cloud server 102 may be a remote management server or a data center that is managed by a third party, or jointly managed, or managed in coordination and association with one or more of the plurality of different WCNs or different service providers.

Each of the wireless communication devices 104A, 104B, . . . , 104N may also be referred to as a local network node or a mesh node (when connected to each other in a wireless mesh network). Each of the wireless communication devices 104A, 104B, . . . , 104N, may be configured to capture and monitor raw RF signals from direct current (DC, i.e., 0 hertz (Hz)) to 300 Gigahertz (GHz) and analyze the captured RF signals. Each of the wireless communication devices 104A, 104B, . . . , 104N may be a multi-functional device for spectrum-sensing across a plurality of frequency bands (DC to 300 GHz) as well as wireless data communication to one or more other wireless communication devices in the wireless mesh network. Examples of the wireless communication devices 104A, 104B, . . . , 104N, may include but are not limited to a wide-range spectrum monitoring device or a special dual-purpose device for spectrum monitoring and wireless data communication, a modified repeater device, or a 5G backplane system. The wireless communication devices 104A, 104B, . . . , 104N may be portable devices.

In accordance with an embodiment, each of the wireless communication devices 104A, 104B, . . . , 104N may perform local signal processing. The local signal processing in the system 100A may refer to how each wireless communication device may initially handle radio frequency (RF) signals before sending data to a fusion center, such as the central cloud server 102. Each of the wireless communication devices 104A, 104B, . . . , 104N may be configured to capture and monitors raw RF signals from DC (0 Hz) to 300 GHz and then may down-convert the captured RF signals to predefined intermediate frequencies (like 5 GHz, 6 GHz) that can be processed by a corresponding WLAN chipset in the wireless communication devices 104A, 104B, . . . , 104N. For example, each of the wireless communication devices 104A, 104B, . . . , 104N may be configured to perform wideband spectrum monitoring with high sensitivity and dynamic range while intelligently utilizing the processing capabilities of a commercial WLAN chipset (e.g., IEEE 802.11be chipset and modems) modified for signal monitoring with intelligent signal down conversion and signal processing architectures to achieve wide frequency range coverage (DC to 300 GHz) in a cost-effective manner.

Typically, IEEE 802.11be/ax (Wi-Fi® 7/6E) hardware is conventionally designed for high-throughput wireless networking, operating in 2.4 GHz, 5 GHz, and 6 GHz bands. It provides features like multi-link operation (MLO), 320 MHz channels, 4K Quadrature Amplitude Modulation (QAM) modulation, and multi-user Multiple-Input Multiple-Output (MIMO) primarily for data communication between access points and client devices.

The present disclosure intelligently modifies and repurposes IEEE 802.11be/ax hardware beyond its standard networking role by integrating wideband spectrum monitoring capabilities. In an example, the wireless communication device 104A may leverage the hardware's advanced signal processing capabilities while extending frequency coverage from DC to 300 GHz through multi-stage conversion (otherwise primary coverage is only frequency range of 1-7 GHz and that too not for spectrum monitoring purpose). This adaptation enables concurrent operation as a wireless networking device and a spectrum monitoring platform, utilizing features like MLO and high-speed signal processing for signal detection, classification, and analysis across a significantly broader range than traditional Wi-Fi® operations.

In an implementation, multiple monitoring nodes, such as the wireless communication devices 104B, 104C, . . . , 104N, may operate concurrently across different frequency bands. In such a case, each node may perform local analysis, filtering, and feature extraction on these multiple frequency bands concurrently, creating MLO data streams 108A, 108B, . . . , 108N that may include preprocessed signal information. The MLO data streams 108A, 108B, . . . , 108N may be synchronized data flows generated by the wireless communication devices 104B, 104C, . . . , 104N that may include signal information captured concurrently across multiple frequency bands (e.g., 5 GHz and 6 GHz). The MLO data streams 108A, 108B, . . . , 108N may then be sent to a central fusion center, such as the central cloud server 102, for processing and combining. This distributed approach may further allow for enhanced spatial coverage, improved jammer resistance through diversity, and scalable deployment while maintaining high-resolution analysis capabilities with higher-level correlation and pattern detection across all nodes.

In contrast to conventional systems, the disclosed system 100A enables detection of coordinated multi-band signal patterns that exist simultaneously across different frequency bands (e.g., 2.4, 5, 6, or 7 GHz) and the plurality of different spatial locations, such as spatial locations 106A, 106B, . . . , 106N through synchronized cross-correlation of MLO data streams. By analyzing the relationship between signals occurring at different intermediate frequency bands and locations at the same time, the system 100A may identify complex patterns that would appear as unrelated signals to conventional monitoring systems. This capability is particularly powerful for detecting sophisticated threats like coordinated jamming attempts or distributed frequency-hopping transmitters that may intentionally spread their activity across multiple bands and locations to avoid detection.

Figure 1B:
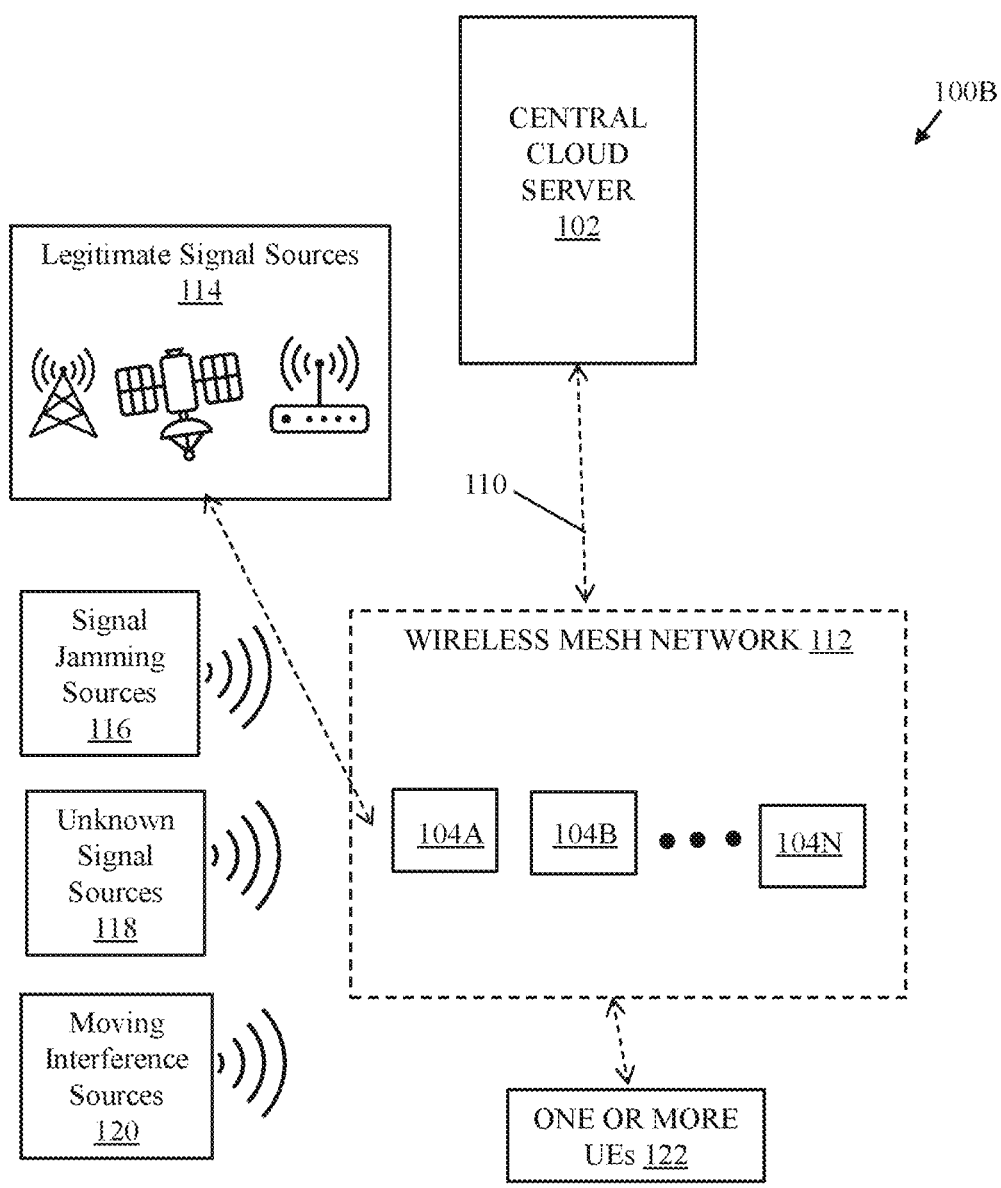
FIG. 1B is a diagram that illustrates an exemplary system for distributed spectrum monitoring with different signal sources, in accordance with another exemplary embodiment of the disclosure.

FIG. 1B is a diagram that illustrates an exemplary system for distributed spectrum monitoring with different signal sources, in accordance with another exemplary embodiment of the disclosure. FIG. 1B is explained in conjunction with elements from FIG. 1A. With reference to FIG. 1B, there is shown a system 100B for enhanced distributed spectrum monitoring. The system 100B may include the central cloud server 102 and the plurality of wireless communication devices, such as wireless communication devices 104A, 104B, . . . , 104N. In this implementation, the wireless communication devices 104A, 104B, . . . , 104N may be interconnected with each other in a wireless mesh network 112. Each of the wireless communication devices 104A, 104B, . . . , 104N may work in cooperation with each other for not only enhanced spectrum monitoring across multiple frequency bands but also wireless data communication and routing across the wireless mesh network 112.

There are further shown different types of signal sources, such as legitimate signal sources 114, signal jamming sources 116, unknown signal sources 118, and moving interference sources 120. The legitimate signal sources 114, for example, may be authorized and licensed wireless carrier network frequencies, for example, 4G, 5G, or upcoming 6G signals from base stations or small cells, frequencies used for direct-to-cell service (e.g., satellite-to-cell phone service), or authorized wireless local area network (WLAN) signals (e.g., Wi-Fi® signals), or other legitimate commercial or non-commercial RF signals, as per use case. The wireless communication devices 104A, 104B, . . . , 104N may not be initially aware of the different types of signal sources and may perform RF signal (airwaves) scanning to detect and identify active signal sources and potential receivers operating on specific frequencies within range. The wireless communication devices 104A, 104B, . . . , 104N may be further communicatively coupled to the central cloud server 102, via a communication network 110.

The communication network 110 may refer to the infrastructure and protocols enabling secure data exchange between the wireless communication devices 104A, 104B, . . . , 104N and the central cloud server 102 through one or more known wireless transmission mediums.

The wireless mesh network 112 may be a resilient, high-capacity wireless network that extends the reach of a fiber backbone to provide widespread coverage to end users, such as the one or more UEs 122 via the wireless communication devices 104A, 104B, . . . , 104N. The fiber backbone (not shown) may be a high-performance, fiber-optic core network infrastructure that connects central offices, data centers, and the wireless mesh network 112. The fiber backbone may aggregate traffic from the central offices and data centers and provide seamless integration between the fiber and wireless network components.

The legitimate signal sources 114 may refer to authorized transmitters operating within licensed frequency bands in compliance with regulatory standards and predetermined protocols. Examples of the legitimate signal sources may include, but not limited to, cellular base stations, small cells, or repeaters, Licensed FM/AM radio stations, commercial broadcast transmitters, public safety communications, satellite downlinks, authorized military communications within designated bands (if that is required in a use case), authorized Wi-Fi® signals, GPS satellites operating at 1575.42 MHz, and licensed point-to-point microwave links (e.g., cellular backhaul links operating at Jun. 11, 2018/23 GHz or other bands, financial trading networks using 70/80 GHz E-band, Broadcast studio-to-transmitter links (STL), for example, at 950 MHz, utility Supervisory Control and Data Acquisition (SCADA) networks operating at 4/6 GHz, enterprise building-to-building connections at 60 GHz, or public safety backhaul networks at 4.9 GHz, or Internet service provider backbone links).

The signal jamming sources 116 may refer to devices deliberately emitting interference signals designed to disrupt or degrade wireless communications across single or multiple frequency bands. Examples of the signal jamming sources may include, but not limited to, GPS jammers, cellular blockers (e.g., multi-band jammers (GSM/CDMA/3G/4G/5G), Frequency hopping cell disruptors, Band-specific blockers (700 MHz/850 MHz/1900 MHz), Smart jammers targeting control channels, or Base station signal overriders), broadband noise generators, targeted frequency disruptors, and pulsed interference systems.

The unknown signal sources 118 may refer to transmitters producing RF emissions that do not conform to known signal characteristics, protocols, or authorized frequency allocations. Examples of the unknown signal sources may include, but not limited to, unidentified transmitters, non-standard modulation signals, encrypted transmissions of unknown origin, sporadic unauthorized emissions, and signals using uncharacterized protocols.

The moving interference sources 120 may refer to mobile entities generating RF interference that change spatial location over time, whether intentional or unintentional. Examples of the moving interference sources may include, but not limited to, vehicles with malfunctioning electronics, mobile jamming platforms, interference-generating drones, vessels with non-compliant radio systems, and portable unauthorized transmitters in motion.

The one or more UEs 122 may correspond to a wireless device, such as a client device or a telecommunication hardware used by an end-user to communicate. Some of the one or more UEs 122 may refer to a combination of a mobile equipment and subscriber identity module (SIM). Examples of the one or more UEs 122 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

In accordance with an embodiment, the wireless communication devices 104A, 104B, . . . , 104N may maintain networking functionality in the system 100B while adding capabilities for detecting different types of signal sources, such as the legitimate signal sources 114, the signal jamming sources 116, the unknown signal sources 118, and the moving interference sources 120.

Figure 2:
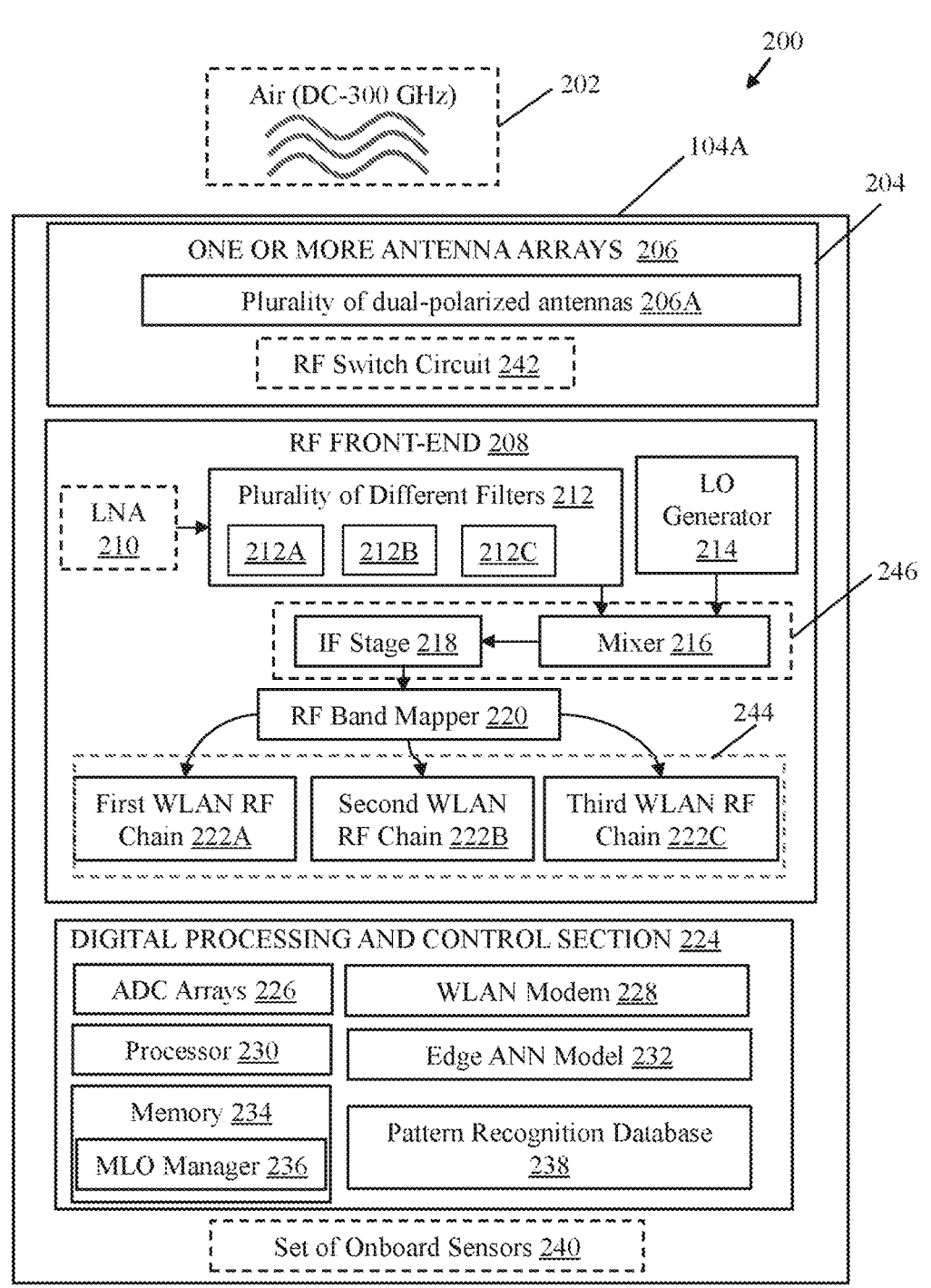
FIG. 2 is a block diagram that illustrates various components of an exemplary wireless communication device for local processing and spectrum monitoring, in accordance with an exemplary embodiment of the disclosure.

FIG. 2 is a block diagram that illustrates various components of an exemplary wireless communication device for local processing and spectrum monitoring, in accordance with an exemplary embodiment of the disclosure. FIG. 2 is explained in conjunction with elements from FIGS. 1A and 1B. With reference to FIG. 2, there is shown a block diagram 200 of the wireless communication devices 104A.

The wireless communication devices 104A may include a radio frequency (RF) input 204. The RF input 204 may include one or more antenna arrays 206. The one or more antenna arrays 206 may include a plurality of dual-polarized antennas 206A. In an implementation, the antenna array system, such as a MIMO antenna array may include a radio frequency (RF) switch circuit 242. The wireless communication devices 104A may include an RF front-end 208 and a digital processing and control section 224.

The RF front-end 208 may include a Low-Noise Amplifier (LNA) 210, a plurality of different filters 212, a local oscillator generator 214, a mixer 216, an intermediate frequency (IF) stage 218, an RF band mapper 220, a WLAN radio (e.g., an IEEE 802.11be radio) comprising distinct RF chains for concurrent operations across different frequency bands, such as a first WLAN radio chain 222A (e.g., RF chain 1 for 2.4 GHz band processing), a second WLAN radio chain 222B (e.g., RF chain 2 for 5 GHz band processing), and a third WLAN radio chain 222C (e.g., RF chain 3 for 6 GHz band processing). Each chain may comprise dedicated components (LNA, mixers, filters) optimized for its specific frequency band, enabling simultaneous multi-band operation (not shown for the sake of brevity).

The digital processing and control section 224 may be configured to handle digital processing (e.g., analog to digital conversions, digital signal processing, multi-link operations (MLO) processing, baseband processing etc.,), WLAN modem functions, as well as system control functions (e.g., a system on a chip (Soc)). The digital processing and control section 224 may include ADC arrays 226, a WLAN modem 228, a processor 230, an edge artificial neural network (ANN) model 232, a memory 234 with an MLO manager 236, and a pattern recognition database 238. In an implementation, the wireless communication devices 104A may further include a set of onboard sensors 240.

The RF input 204 may be configured to receive RF signals across a plurality of frequency bands in a range of direct current (DC) to 300 gigahertz (GHz). The RF input 204 may include one or more antenna arrays 206, such as a MIMO antenna array and a wideband antenna array. The one or more antenna arrays 206 may include the plurality of dual-polarized antennas 206A configured to receive radio frequency signals in vertical and horizontal polarizations across the plurality of frequency bands, for example, ranging from direct current (DC) to 300 GHz. The one or more antenna arrays 206 may incorporate dedicated MIMO elements for 2.4/5/6 GHz Wi-Fi® bands and wideband antenna elements for full spectrum coverage (e.g., DC-300 GHz) enabling comprehensive spectrum monitoring capabilities across multiple frequency bands (i.e., not only supports primary coverage from 1-7 GHz but manifest extended range capability to DC-300 GHz through multi-stage conversion techniques).

The RF front-end 208 may be configured to apply band-specific filtering to the received radio frequency signals to isolate signals-of-interest with at least 50-80 decibels of spurious signal suppression. In an implementation, the RF front-end 208 may maintain a noise figure below 3 decibels and phase noise performance of −110 dBc/Hz at 10 kHz offset with dynamic range exceeding 90 decibels. The RF front-end 208 may comprise low noise amplification stages, pre-filtering components, first stage mixing with local oscillator, and initial intermediate frequency stage processing.

The RF band mapper 220 may be configured to perform mapping of received radio frequency signals to predefined intermediate frequencies (e.g., 2.4 GHz, 5 GHz, or 6 GHz). The RF band mapper 220 may enable concurrent processing of signals across multiple frequency bands. The RF band mapper 220 may perform demultiplexing of signals into WLAN bands (Wi-Fi® bands) and provide dedicated signal paths for 2.4/5/6 GHz processing with multi-stage frequency conversion.

The ADC arrays 226 may refer to analog-to-digital converter arrays configured to digitize the down-converted signals for processing. The WLAN modem 228 may refer to a wireless local area network modem configured to handle baseband signal processing, including digital processing operations such as Fast Fourier Transform (FFT)/Inverse Fast Fourier Transform (IFFT), signal equalization, Medium Access Control (MAC) layer processing, and Quality of Service (QoS) management.

The processor 230 may be configured to execute spectrum analysis, signal classification, and cross-band correlation across multiple intermediate frequency bands (e.g., 5 GHz and 6 GHz). The processor 230 may be part of Soc and may incorporate one or more processing units including Central Processing Unit (CPU), Neural Processing Unit (NPU), and Digital Signal Processor (DSP) for specialized signal processing tasks.

The memory 234 may refer to a storage configured to store processing data and signal patterns. The memory 234 may provide hierarchical memory architecture for efficient data access and processing. Examples of implementation of the memory 234 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The MLO manager 236 may refer to a multi-link operation manager configured to control concurrent processing across multiple frequency bands and manage system interfaces for coordinated operation.

The pattern recognition database 238 may refer to a database system configured to maintain historical signal correlation patterns and update correlation thresholds based on pattern recognition results, enabling adaptive learning and pattern evolution tracking.

The set of onboard sensors 240 refers to environmental and operational sensors configured to provide supplementary data to support signal classification and threat assessment capabilities, where the sensors enable enhanced contextual awareness for signal processing decisions. For example, the set of onboard sensors 240 may include one or more image sensors, a lidar sensor, a Radar, a spatial position sensor, an inertial measurement unit (IMU) sensor, and a temperature sensor. A wide range of sensors may be integrated or connected to enrich each wireless communication device 104A with environmental awareness for intelligent intra-node and inter-node optimizations. For example, the one or more image sensors may be used to visually monitor the surroundings of each network node. The lidar sensor may be referred to as light detection and ranging sensors used to enable accurate three-dimensional (3D) profiling and depth perception of surroundings of each network node for precise beam alignment. The Radar may be a built-in radar to detect and track motion to monitor movement patterns of surrounding objects and predict potential RF signal blockers. The spatial position sensor may be a global navigation satellite system (GNSS) sensor, such as global positioning system (GPS) to provide location awareness for each network node used for geospatial analytics and positioning capabilities. The IMU sensor may include a combination of accelerometers, gyroscopes, and magnetometers (sometimes magnetometers may not be used) that typically measures the body's specific force, angular rate, and orientation of a given body. In this case, such raw IMU output may be processed to measure node vibrations, shocks, and orientation changes at each network node.

The RF switch circuit 242 may refer to a radio frequency switch circuit configured to route signals between multiple antenna elements with switching time less than 100 microseconds and frequency step size of 100 kHz. The RF switch circuit 242 may enable rapid transitions between frequency bands for continuous spectrum monitoring. In an implementation, the RF switch circuit 242 may be configured to perform dynamic beam steering by switching between different phased antenna arrays installed at different positions around the wireless communication device 104A to route RF signals along different directions as required. This enables adaptable signal propagation, responding to changing network conditions and optimizing communication paths for improved reliability and performance.

The WLAN radio 244 may be a part of a WLAN chipset. The WLAN radio 244 may include distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 GHz band processing). Each chain may comprise dedicated components (LNA, mixers, filters) optimized for its specific frequency band, enabling simultaneous multi-band operation. The circuitry 246 may include the mixer 216, the IF stage 218, and/or other control circuits.

In operation, the RF input 204 may be configured to receive RF signals across a plurality of frequency bands in a range of direct current (DC, i.e., 0 Hz) to 300 gigahertz (GHz). The RF input 204 may comprise the one or more antenna arrays 206 that comprises the plurality of dual-polarized antennas 206A configured to capture the RF signals in vertical and horizontal polarizations across the plurality of frequency bands. In FIG. 2, the RF signals in the air captured by the one or more antenna arrays 206 may be represented by wavy lines (i.e., the airwave 202). In an example, the one or more antenna arrays 206 may be a 4×4 MIMO array. In an implementation, the one or more antenna arrays 206 may be an antenna array system that may include one or more wide array antennas and may provide 360° coverage pattern. In an implementation, the one or more antenna arrays 206 may include four independent antenna elements with different phases (0°, 90°, 180°, 270°). The one or more antenna arrays 206 may be configured to receive multiple independent data streams concurrently on different antennas, effectively increasing capacity without requiring more bandwidth and when receiving the same signal from different antennas may provide diversity gain to combat fading and improve signal reliability. Further, the plurality of dual-polarized antennas 206A are configured to enhance signal reception and improve spectral efficiency by capturing RF signals in both vertical and horizontal polarizations across multiple frequency bands. For example, each antenna element within the one or more antenna arrays 206 may be equipped with orthogonally oriented dipoles or patch radiators that are capable of concurrently receiving RF signals in both vertical and horizontal polarization planes. In this case, since each antenna element supports two independent polarization modes (vertical and horizontal), the combination of MIMO with dual polarization effectively doubles the data communication capacity without increasing bandwidth or frequency usage. Further, as the plurality of dual-polarized antennas 206A allows two independent communication channels per antenna, the need for additional physical antennas is reduced, which may be useful for space-limited applications for compact antenna design and contribute to portability of the wireless communication device 104A. The combination of MIMO feature with the dual-polarized antennas allows the wireless communication device 104A to capture signals from multiple spatial points and enhances detection accuracy with full polarization coverage for all types of transmissions. This helps detect hidden, weak, or non-line-of-sight (NLOS) signals, useful in crowded RF environments.

In accordance with an embodiment, the plurality of frequency bands captured by the one or more antenna arrays 206 may range from DC to 100 gigahertz (GHz). In other words, the wireless communication device 104A may perform a real-time, wide-band spectrum monitoring across frequencies ranging from DC to 100 GHz with high resolution (for example, down to 19.53125 kHz). In accordance with an embodiment, the plurality of frequency bands captured by the one or more antenna arrays 206 may range from direct current (DC) to 300 gigahertz (GHz). The wireless communication device 104A may be a multi-function device for spectrum-sensing across the plurality of frequency bands with high resolution as well as wireless data communication to one or more other wireless communication devices 104B, 104C, . . . , 104N in the wireless mesh network 112. In other words, each network node functions as both a spectrum analyzer and a high-speed communication endpoint.

In accordance with an embodiment, the RF front-end 208 may be coupled to the one or more antenna arrays 206. The RF front-end 208 may comprise the plurality of different filters 212. The plurality of different filters 212 may be configured to apply band-specific filtering operation to the received RF signals across the plurality of frequency bands to obtain filtered RF signals. In an implementation, the LNA 210 may be placed before pre-filtering stage, as spectrum monitoring may often involve detecting weak or distant signals (e.g., covert transmissions, military radar, low-power IoT devices). Further, to sniff RF signals from the airwave 202, especially the broad frequency range (e.g., DC-300 GHz), the LNA 210 first approach ensures that signals across all frequencies are captured with minimal loss before band-specific filtering. The LNA 210 may amplify such weak signals before they encounter any filtering losses, improving detection accuracy. In some implementations, the LNA 210 may not be placed before the plurality of different filters 212 to reduce out-of-band interference. The wireless communication device 104A may opt for both options of LNA 210 first or without LNA 210 alternatively to see if there is any difference in spectrum monitoring results for enhanced analysis.

In an example, the plurality of different filters 212 may be pre-filters that may process signals across distinct frequency ranges. The plurality of different filters 212 may include a first band filter 212A (e.g., a low-band filter) configured to process the received RF signals in a first frequency range. The plurality of different filters 212 may further include a second band filter 212B (e.g., a mid-band filter) configured to process the received RF signals in a second frequency range, where the second frequency range may be higher than the first frequency range. The plurality of different filters 212 may further include a third band filter 212C (e.g., a high-band filter) configured to process the received RF signals in a third frequency range, where the third frequency range may be higher than the second frequency range. In an implementation, the first frequency range may be 1 hertz (Hz) to 1 GHz, the second frequency range may be 1.1 to 3 GHz, and the third frequency range may be between 3.1 GHz to 300 GHz. In another implementation, the first frequency range may be 50 MHz to 2 GHz, the second frequency range may be 2.4 to 6 or 7 GHz, and the third frequency range may be between 7.1 GHz to 300 GHz. The first frequency range that may be used for low band filtering operation may eliminate interference from TV, FM, and LTE signals. The second frequency range that may be used for mid band filtering operation may be used to suppress cellular and adjacent Wi-Fi® bands, and the third frequency range may be used for high band filtering operation may isolate high-frequency signals from 5G, radar, and millimeter-wave sources. In an implementation, the RF front-end 208 may employ a multi-stage filtering architecture that may include cavity filters providing high-Q resonance, Surface Acoustic Wave (SAW) filters, and Bulk Acoustic Wave (BAW) filters for precise frequency selectivity. In some implementation, the wireless communication device 104A may implement an adaptive digital filtering operation using DSP-based notch filters after the analog filtering stage, which may enhance the overall spurious signal rejection capabilities. Further, the implementation of narrowband bandpass filters may enable selective passing of signals-of-interest while maintaining substantial attenuation of unwanted RF signals, wherein the multi-stage spurious suppression techniques may achieve 50-80 dB of rejection. This comprehensive filtering approach may be particularly advantageous in dense RF environments where multiple interfering signals may be present, enabling the system to effectively isolate and monitor specific frequency bands of interest while maintaining high signal quality through robust interference suppression.

In accordance with an embodiment, the band-specific filtering operation may include determining an input RF signal frequency and directing the input RF signal through one of three concurrent filtering paths based on frequency range. For example, a first path employing a low-band filter for frequencies of 1 Hz to 2 GHz (or 50 MHz to 1 GHz as per use case) with subsequent up-conversion, a second path employing a mid-band filter for frequencies of 2.4 GHz to 7 GHz (or 1.1 to 3 GHz) with direct conversion, and a third path employing a high-band filter for frequencies of 7.1 GHz to 300 GHz (or 3.1 to 300 GHz) with down-conversion, wherein filtered signals from all paths may converge at the circuitry 246 (e.g., a mixer stage, such as the mixer 216) that may utilize a high-side local oscillator (e.g., the local oscillator generator 214) that may operate above a threshold frequency of 9.8 GHz for final frequency conversion, thereby achieving efficient spectrum coverage while maintaining signal integrity. The second band filter (i.e., the mid-band filter) for frequencies of 2.4 GHz to 7 GHz (or 1.1 to 3 GHz) may be configured to perform direct conversion as frequencies are already close to the predetermined intermediate frequencies (e.g., the Wi-Fi® frequencies).

In accordance with an embodiment, the local oscillator generator 214 may be configured to generate tunable local oscillator frequencies above a threshold frequency. In an example, the threshold frequency may be 9.8 GHz. The circuitry 246 may be coupled to the plurality of different filters 212 and the local oscillator generator 214. The circuitry 246 may be further configured to determine an input RF signal frequency of the received RF signals from among the plurality of frequency bands of Dc to 300 GHz. The circuitry 246 may be further configured to generate, via the local oscillator generator 214, a specific local oscillator frequency that is higher than the determined RF signal frequency by a defined offset. The circuitry 246 may be further configured to perform a high-side injection based on the specific local oscillator frequency to push the image frequencies above the threshold frequency (while maintaining phase noise performance of better than −90 dBc/Hz (i.e., decibels relative to carrier) at 100 kHz offset). For example, when processing a 6 GHz signal, the local oscillator generator 214 may generate a frequency of 11 GHz to create a desired intermediate frequency at 5 GHz (e.g., 11 GHz−6 GHz=5 GHz) and an image frequency at 17 GHz (i.e., 11 GHz+6 GHz=17 GHz) that may be naturally attenuated, thereby enabling efficient frequency conversion while ensuring image frequencies are pushed into naturally attenuating regions of the spectrum. The local oscillator frequencies may be adjusted in real-time based on the detected input signal frequency, desired intermediate frequency for processing, required image frequency suppression, and phase noise optimization requirements. Further, the phase noise performance of better than −90 dBc/Hz (i.e., decibels relative to carrier) at 100 kHz offset may be indicative of reduced phase noise (more negative dBc/Hz), which means better frequency stability and better stability as it enables more accurate frequency conversion and improved signal quality in the converted intermediate frequencies In accordance with an embodiment, the circuitry 246 may be configured to execute a frequency shifting operation in one or more frequency conversion stages in which one or more tuned local oscillator frequencies above the threshold frequency may be injected at the circuitry 246 to push image frequencies above the threshold frequency and shift the filtered RF signals to predefined intermediate frequencies. The frequency shifting operation may include either one or multiple frequency conversion stages, where each conversion stage may be configured to translate a received RF signal to a predetermined intermediate frequency through strategic local oscillator injection. When mixing occurs of the circuitry 246 (i.e., mixing of the tuned local oscillator frequency with the filtered RF signal at an RF frequency at the mixer stage, i.e., at the mixer 216), a sum and a difference frequency may be obtained. The difference frequency (RF-LO frequency) may be selected as the desired intermediate frequency (IF), such as 5 GHz, 6 GHz, or 7 GHz while the sum frequency becomes the image frequency and may be discarded. In this case, the cleverness may lie in the use of high-side local oscillator injection in which the image frequencies may be pushed above 9.8 GHz (e.g., the threshold frequency). At these high frequencies i.e., the image frequencies, the signals naturally attenuate more due to atmospheric absorption, path loss, material absorption, or component limitations. In this case, the IF selection may be predetermined ensuring compatibility with subsequent digitization hardware (e.g., the IEEE 802.11be chipset, such as the WLAN radio 244 and the WLAN modem 228). The down-conversion to predefined intermediate frequencies allows the wireless communication device 104A to leverage, for example, the IEEE 802.11be chipset's processing architectures, reducing hardware complexity, while re-purposing for enhanced spectrum monitoring as well as wireless data communication. Thus, the intelligent use of frequency shifting architecture provides simpler filtering requirements since images are naturally attenuated and enable cleaner signal conversion with less interference. The intelligent use of frequency shifting architecture reduces complexity and cost of the RF front-end 208 and improves overall system performance. In an example, the high-side local oscillator frequencies means that the local oscillator frequency may be higher than the target RF signal. The local oscillator generator 214 may be a tunable local oscillator that may generate different tuned local oscillator frequencies depending on detected input signal frequency in the filtered RF-signal and the desired intermediate frequency (e.g., 5 GHz or 6 GHz) to be generated and further processed.

It is to be understood that WLAN chipsets like Wi-Fi® 7 chips may only process certain frequencies (like 2.4 GHz, 5 GHz, 6 GHz). However, if many other frequencies (up to 300 GHz) are to be monitored then these other frequencies may be converted intelligently so the WLAN chipsets (e.g., the WLAN radio 244 and the WLAN modem 228) may understand them. In an example, the circuitry 246 may be configured to execute a multi-stage frequency shifting operation, where for signals in different frequency ranges, the following conversions may be implemented. For example, for signals at 100 GHz, a first stage conversion may inject an 85 GHz local oscillator frequency to achieve a difference frequency of 15 GHz (100 GHz−85 GHz=15 GHz) while producing an image frequency at 185 GHz (100 GHz+85 GHz=185 GHz), followed by a second stage employing a 9 GHz local oscillator frequency to convert the 15 GHz signal to a final intermediate frequency of 6 GHz (15 GHz−9 GHz=6 GHz), with the second image at 24 GHz image frequency (15 GHz+9 GHz=24 GHz) experiencing natural attenuation. The final intermediate frequency of 6 GHz may be one of the predefined intermediate frequencies.

In accordance with an embodiment, the circuitry 246 may be further configured to convert the filtered RF signals at the predefined intermediate frequencies in digital form to obtain digitized down-converted signals. The filtered RF signals at the predefined intermediate frequencies may be the down-converted IF signals, which may then be processed through an Analog-to-Digital Converter (ADC) that may sample and convert the analog IF signals into digital form. Further, the selection of predefined intermediate frequencies may be specifically configured to avoid interference from other signals while matching ADC bandwidth and resolution requirements.

In accordance with an embodiment, the RF front-end 208 may be further configured to demultiplex the filtered RF signals at the predefined intermediate frequencies into a plurality of different wireless local area network (WLAN) frequency channels. The RF front-end 208 may be further configured to assign a distinct signal processing path to each of the plurality of different WLAN frequency channels. The RF front-end 208 may be further configured to perform an RF mapping of the received RF signals in the plurality of frequency bands to one of the predefined intermediate frequencies corresponding to a first intermediate frequency band or a second intermediate frequency band. The first intermediate frequency band may be different from the second intermediate frequency band. Each of the predefined intermediate frequencies corresponding to the first intermediate frequency band and the second intermediate frequency band is one of: 2.4 GHz, 5 GHz, 6 GHz, 7 GHz, or other unlicensed or Industrial, scientific, and medical (ISM) frequency band. The RF band mapper 220 may be configured to demultiplex the filtered RF signals at the predefined intermediate frequencies (i.e. the down-converted signals in the predetermined intermediate frequencies (e.g., a common intermediate frequency or one or more predetermined intermediate frequencies)) into different WLAN frequency bands (e.g., 2.4 GHz, 5 GHz, and 6 GHz) and may assign dedicated paths for efficient processing. The frequency mapping may ensure that the signals are optimally allocated and processed based on resource availability. Based on the resource status, the best IF band assignment out of the different WLAN frequency bands may be done. Once the RF mapping is complete, the digitized down-converted signals signal may then be processed.

In an example, the RF front-end 208 may assign dedicated processing paths to the different WLAN frequency bands, where the signals may undergo specific filtering, mixing, and digitization processes based on predefined IF mapping configurations. In other words, the RF front-end 208 may assign dedicated processing paths to the WLAN radio 244 (e.g., an IEEE 802.11be radio) comprising distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 GHz band processing). Each chain may comprise dedicated components (LNA, mixers, filters) optimized for its specific frequency band, enabling simultaneous multi-band operation. This comprehensive RF mapping approach may enable efficient spectrum utilization and optimal signal processing, particularly beneficial for next operation of implementing Multi-Link Operation (MLO) that may require dynamic frequency assignment across multiple bands while maintaining minimal interference and maximum processing efficiency.

In accordance with an embodiment, the processor 230 may be configured to concurrently process the digitized down-converted signals in a first intermediate frequency band and a second intermediate frequency band corresponding to the predefined intermediate frequencies, based on configuration of multi-link operation (MLO) parameters in the wireless communication device 104A. The MLO parameters may include buffer sizes for each Intermediate Frequency (IF) band that determine temporary data storage capacity (e.g., configured as powers of 2, like 4096 or 8192 samples), Fast Fourier Transform (FFT) window parameters (including window size, overlap percentage, and window function type) that control frequency resolution and processing accuracy, sampling rates for each Analog-to-Digital Converter (ADC) of the ADC arrays 226 that determine data acquisition speeds (e.g., 160 MHz for 5 GHz band, 320 MHz for 6 GHz band), cross-correlation thresholds that define sensitivity for pattern detection between bands (typically ranging from 0.7 to 0.95 for correlation coefficients), and memory allocation settings for continuous FFT buffers that manage ongoing computations through circular buffer implementations and cache-aligned memory allocation. The MLO parameters configuration may operate in concert to enable efficient concurrent processing, maintain processing continuity, prevent data loss, optimize resource utilization, and ensure reliable cross-band correlation, with their specific values being tuned based on hardware capabilities, processing requirements, signal characteristics, and system performance targets. For example, the concurrent processing of digitized down-converted signals in 5 GHz and 6 GHz bands may be implemented by first configuring MLO parameters where the 5 GHz band may utilize a 4096-sample buffer with 160 MHz sampling rate and 1024-point FFT processing, while the 6 GHz band employs a larger 8192-sample buffer with 320 MHz sampling rate and 2048-point FFT to accommodate its higher bandwidth requirements. The processor 230 may maintain two concurrent processing paths, where the first path (e.g., the second WLAN radio chain 222B) may handles the 5 GHz IF signals with a correlation threshold of 0.85 and 75% FFT window overlap for enhanced temporal resolution in potentially noisier environments, while the second path (e.g., the third WLAN radio chain 222C) may processes 6 GHz IF signals with a stricter 0.90 correlation threshold and similar 75% overlap for cleaner band operation.

In accordance with an embodiment, for the concurrent processing of the digitized down-converted signals for the spectrum monitoring, the processor 230 may be further configured to execute a sliding window Fast Fourier Transform (FFT) operation on the digitized down-converted signals from each of the first intermediate frequency band and the second intermediate frequency band. The processor 230 may be further configured to maintain a continuous FFT buffer for each of the first intermediate frequency band and the second intermediate frequency band. The processor 230 may be further configured to compute cross-correlation coefficients between FFT outputs of the first intermediate frequency band and the second intermediate frequency band to detect temporal signal patterns. In other words, for spectrum monitoring, the processor 230 may continuously execute sliding window FFT operations on both bands concurrently, maintaining separate circular FFT buffers (4 memory blocks for 5 GHz, 8 for 6 GHz) to store historical FFT outputs, and compute cross-correlation coefficients between the bands with a minimum confidence threshold of 0.90 to detect temporal signal patterns and potential interference. The cross-correlation coefficients may measure the similarity between signals in two different frequency bands (in this case, 5 GHz and 6 GHz) at different time shifts. The coefficient may range from $-1$ to 1, where "1" may indicate a perfect correlation (signals are similar), "0" may indicate no correlation (signals are unrelated); and "$-1$" may indicate perfect negative correlation (signals are inversely related). The correlation coefficient calculation may normalize both signals, compute their dot product, and compare against the threshold (0.90). This MLO-based concurrent processing enables real-time spectrum analysis across both bands while optimizing resource utilization through band-specific parameter tuning, achieving enhanced spectrum monitoring capabilities through concurrent pattern detection and cross-band correlation analysis.

In accordance with an embodiment, the processor 230 may be further configured to perform a local cross-band correlation between the processed digitized down-converted signals from the first intermediate frequency band and the second intermediate frequency band to identify related signal patterns. By taking the example of the cross-band correlation between 5 GHz and 6 GHz intermediate frequency bands, the related signal pattern may be identified by analyzing the temporal and spectral relationships between the processed digitized down-converted signals from both bands. The processor 230 may normalize the FFT outputs from both bands to account for power level differences and then may compute cross-correlation coefficients using a sliding window approach with a defined confidence threshold, for example, 0.90 confidence threshold. The related signal patterns may be identified through several key characteristics, such as temporal synchronization (where similar signal bursts appear in both bands with minimal time delay), spectral similarity (matching frequency components across bands indicating potential interference or legitimate multi-band transmissions), and amplitude correlation (relative signal strength patterns that occur simultaneously). For example, when a correlation coefficient exceeds 0.95, it might indicate strong cross-band interference like certain microwave emissions affecting both bands, while coefficients between 0.90 and 0.95 could suggest legitimate Wi-Fi® traffic utilizing both bands for MLO operation. The processor 230 may maintain a pattern history buffer in the pattern recognition database 238 for each band and employs adaptive thresholding to distinguish between different types of related patterns, such as periodic interference (showing regular temporal patterns), burst transmissions (appearing as correlated spikes across bands), or continuous signal presence (sustained high correlation over extended periods), enabling real-time identification and classification of multi-band signal relationships.

In accordance with an embodiment, the processor 230 may be further configured to compute correlation matrices for signal segments from each first intermediate frequency band and the second intermediate frequency band for the cross-band correlation. The processor 230 may be further configured to merge correlation results using a synchronized timing reference to maintain a real-time or near real-time cross-band correlation. The correlation matrix for signal segments may refer to the relationship between signals across different intermediate frequency bands (e.g., 5 GHz and 6 GHz bands), where each element in the matrix indicates how strongly two segments may be related. For a 4×4 MIMO system with dual polarization, the correlation matrices may capture both spatial and temporal relationships between signal segments, for example, 320 MHz segments from each band (e.g., total 640 MHz bandwidth). In an implementation, the processor 230 may be configured to compute three distinct types of correlation matrices for comprehensive signal analysis across the across different intermediate frequency bands (e.g., 5 GHz and 6 GHz bands like Wi-Fi® 7 bands). For example, a spatial correlation matrix (4×4) that may compare signals between different antennas in the MIMO array showing similarity values between 0 (independent) and 1 (strongly related), a polarization correlation matrix (2×2) that may analyze vertical and horizontal polarization relationships (V-V, V-H, H-V, H-H) to understand signal propagation characteristics, and a temporal correlation matrix that tracks signal patterns and their evolution over time to identify recurring patterns or interference. Such correlation matrices may undergo a merging process where time-stamped correlation results from different time windows may be combined using exponential weighting (favoring recent data) and normalized for proper scaling—for example, in a two-window scenario, a 5 GHz antenna signal [0.5, 0.8, 0.7] correlated with a 6 GHz signal [0.4, 0.7, 0.8] might show a strong correlation of 0.92 in the first window, while the same antenna signals [0.3, 0.4, 0.2] and [0.1, 0.2, 0.3] might show a weaker correlation of 0.45 in the second window, resulting in a merged moderate correlation of 0.68 after weighted averaging. This sophisticated correlation and merging process enables real-time signal tracking across bands, interference pattern detection, understanding of spatial relationships, monitoring of polarization changes, and identification of temporal patterns, all while maintaining synchronized timing references for accurate cross-band analysis.

In accordance with an embodiment, for the cross-band correlation, the processor 230 may be further configured to determine phase coherence between signals detected in the first intermediate frequency band and the second intermediate frequency band. Further, for the cross-band correlation, the processor 230 may be further configured to track phase relationships over time to identify frequency-hopping patterns. In an implementation, the processor 230 may perform phase-based cross-band correlation by determining phase coherence between signals in the first intermediate frequency band (e.g., 5 GHz) and the second intermediate frequency band (6 GHz), while simultaneously tracking phase relationships over time to identify frequency-hopping patterns. The phase coherence determination involves measuring how well the phases align between the two bands (for example, a 5 GHz signal phase of $0.5\pi$ radians compared to a 6 GHz signal phase of $0.52\pi$ radians would yield a small phase difference of $0.02\pi$ radians, indicating high coherence with a value of 0.95), while the phase relationship tracking maintains a historical record of phase values to detect sudden changes and identify periodic patterns that might indicate frequency hopping behavior. Further, clock drift can affect phase measurements. Thus, the processor 230 may be configured to perform clock synchronization for cross-band phase analysis to maintain a common timing reference across both the first intermediate frequency (5 GHz) band sampled at 160 MHz and the second intermediate frequency (6 GHz) band sampled at 320 MHz, with nanosecond-level precision to ensure accurate phase coherence measurements.

The processor 230 may continuously compensate for any clock drift between the bands by resampling signals to the highest rate (e.g., 320 MHz) and applying phase offset corrections based on timestamp comparisons, enabling precise phase relationship tracking and reliable frequency hopping pattern detection.

In accordance with an embodiment, the processor 230 may be further configured to identify related signal sources or interference patterns based on the determined phase coherence and the tracked phase relationships over time. Furthermore, the processor 230 may utilize the phase information to identify related signal sources or interference patterns by analyzing both the coherence metrics and temporal phase relationships. For instance, a frequency hopping transmitter might exhibit high coherence (0.95) with synchronized phase hops every 100 ms across both bands (e.g., synchronized phase changes from $0.5\pi$ to $1.5\pi$ in both bands), while interference might show moderate coherence (0.65) with random phase changes and sporadic presence across bands. This dual approach of coherence measurement and temporal tracking enables the system to effectively distinguish between legitimate frequency-hopping signals and potential interference, providing enhanced spectrum monitoring capabilities in congested RF environment.

In accordance with an embodiment, the processor 230 may be further configured to update a database of historical signal correlation patterns (i.e., the pattern recognition database 238), after each event of the local cross-band correlation. The processor 230 may be further configured to execute a trained edge artificial neural network model, i.e., the edge ANN model 232, to identify recurring signal patterns at each event of the cross-band correlation. In an example, the processor 230 may be configured to execute the trained edge ANN model 232, where the execution process may comprise real-time extraction of key features from correlated signals between the plurality of different predetermined intermediate frequency bands, such as 5 GHz and 6 GHz bands, including spectral energy distribution with 78.125 kHz resolution, phase relationships with 1 microsecond precision, power levels across 320 MHz bandwidth per band, temporal characteristics, and spatial signatures from the one or more antenna arrays 206, such as the MIMO array, followed by processing through multiple neural network layers that may include convolutional neural network (CNN) layers with 3×3 convolution kernels for spatial and spectral feature detection, Long short-term memory (LSTM) layers with, for example, 128 memory units, for temporal pattern analysis, and transformer layers with, for example, 12 attention heads, for contextual pattern extraction. The trained edge ANN model 232 may further employ a classification stage that produces pattern identifications with confidence levels exceeding 95-99% for legitimate Wi-Fi® signals, frequency hopping patterns, interference signatures, and unknown or anomalous signals, wherein the edge ANN model 232 may continuously update pattern recognition thresholds based on successful classifications while maintaining a historical pattern database, thereby enabling real-time identification of recurring signal patterns while achieving low false alarm rates in dynamic spectrum environments through continuous adaptation and learning from each cross-band correlation event.

In accordance with an embodiment, the processor 230 may be further configured to update correlation thresholds based on pattern recognition results from the identified recurring signal patterns at each event of the cross-band correlation. The threshold updating process may dynamically adjust multiple correlation parameters. The minimum correlation coefficient thresholds may range from 0.7 to 0.95 based on signal-to-noise ratios observed in identified patterns. The temporal correlation windows may be adjusted between 1 microsecond and 1 millisecond based on pattern duration statistics. The frequency correlation thresholds between 5 GHz and 6 GHz bands may be scaled according to observed cross-band energy distributions. The spatial correlation thresholds may be derived from MIMO channel state information. When a recurring pattern may be identified with confidence level exceeding 90%, the correlation thresholds may be refined. The refinement may use a weighted average of historical and new threshold values with learning rate of 0.1 to 0.3. This adaptive threshold optimization may maintain detection sensitivity while minimizing false alarms. The optimization may continuously learn from successfully identified patterns across multiple cross-band correlation events.

In accordance with an embodiment, the processor 230 may be further configured to adjust detection parameters of signal correlation patterns in the cross-band correlation based on successful pattern matches to identify new or evolving signal patterns at one or more subsequent events of the cross-band correlation. In an example, the adjustment process may modify spectral detection windows from 20 MHz to 320 MHz based on observed signal bandwidth characteristics. The temporal detection thresholds may be adjusted between 100 nanoseconds to 1 millisecond based on pattern durations. The power level thresholds may be dynamically scaled between −90 dBm to −30 dBm according to signal strength distributions. The phase correlation parameters may be modified between 0 to 360 degrees based on observed phase relationships. The MIMO spatial signatures may be updated using successful detection events across the antenna array. Upon detecting a new signal pattern with 95% confidence level, the system 100 may create a new pattern template. The template may be added to the pattern database for future reference. The detection parameters may be continuously refined using a sliding window of the most recent, for example, 1000 successful pattern matches. This adaptive parameter adjustment may enable identification of emerging or modified signal patterns while maintaining detection accuracy across subsequent cross-band correlation events.

In accordance with an embodiment, the processor 230 may be further configured to classify signals based on the identified recurring signal patterns and the adjusted detection parameters of the signal correlation patterns in the cross-band correlation. The classified signals include legitimate signal communications (e.g., from legitimate signal sources 114), potential jamming signals (e.g., from the signal jamming sources 116), frequency hopping transmissions (e.g., from the moving interference sources 120), or unknown or anomalous signals (e.g., from the unknown signal sources 118) tagged for further analysis.

In accordance with an embodiment, the processor 230 may be further configured to extract signal characteristics including power levels (measured in dBm), phase information (measured in degrees), timing data (with microsecond precision), and spectral characteristics. Each wireless communication device may then perform local signal analysis to extract relevant features, which may include power spectrum density analysis across the plurality of different intermediate frequency bands, signal-to-noise ratio calculations, phase relationship measurements between the intermediate frequency bands, frame structure analysis, modulation classification, or timing interval measurements, or channel state information extraction. The extracted features may then be packaged into MLO data streams with precise timestamps and spatial location information before transmission to the central cloud server 102. This local processing significantly reduces the bandwidth requirements compared to transmitting raw RF data, while still providing comprehensive signal information necessary for the central cloud server 102 to perform cross-correlation analysis and pattern detection across the distributed network of wireless communication devices.

In accordance with an embodiment, the training of the edge ANN model 232 for distributed spectrum monitoring may follow a structured approach that may integrate deep learning techniques with real-time RF signal processing. In an exemplary implementation, the edge ANN model 232 may be used for identifying recurring signal patterns at each event of the cross-band correlation. The edge ANN model 232 may enable adaptive spectrum analysis by leveraging a combination of deep learning, specifically using CNNs, LSTMs, and Transformer-based architectures to recognize complex RF signatures. The training process may include data acquisition and preprocessing, where the system 100 may use some test wireless communication devices (e.g., like the wireless communication devices 104A, 104B, . . . , 104N) and capture RF signals using a 4×4 MIMO antenna array, such as the one or more antenna arrays 206, which may supports dual-polarization and operates from DC to 100 GHz or DC to 300 GHz. The signal filtering and conversion may be applied before digitization, using band-specific filtering to isolate signals of interest. Further, FFT and wavelet transforms may be used for spectral analysis, ensuring frequency-domain features are extracted. Thereafter, feature extraction may occur. The system 100 may apply multi-dimensional analysis combining spectral, temporal, and spatial processing to enhance detection accuracy. Further, MLO-based cross-band correlation may be used to align data from predefined frequency bands like the 5 GHz and 6 GHz bands. Further, features, such as modulation type, frequency components, interference patterns, and spatial signatures may be extracted. Thereafter, the edge ANN model 232 may be trained using labeled historical datasets stored in the pattern recognition database 238. The convolutional neural network (CNN) layers may be used to handle spatial features, while the Long short-term memory (LSTM) layers may be used for sequential pattern detection over time. Transformer-based models may be deployed for contextual feature learning and adaptive anomaly detection to further enhance detection and classification of signals. The federated learning techniques may be employed to enable distributed training across multiple nodes for real-time adaptation to obtain the trained edge ANN model 232.

In accordance with an embodiment, performance optimization to optimize network parameters may be carried out using Bayesian hyperparameter tuning. Further, Pruning, quantization, and knowledge distillation may help reduce computational overhead. The trained edge ANN model 232 may undergo real-time updates via online learning algorithms to adapt to new interference patterns. Examples of the online learning algorithms used may include Multi-Armed Bandit (MAB) Algorithms, Deep Q-Networks (DQN) for spectrum adaptation, or Incremental Learning (Online Backpropagation). Each node in the wireless mesh network 112 may contribute to global model updates (e.g., at the central cloud server 102) without sharing raw data. For example, learned interference features may be shared across different locations to enhance pattern recognition.

Furthermore, during execution, the trained edge ANN model 232 may process incoming RF data to detect signal anomalies, classify threats, and support dynamic spectrum reallocation. The system 100 may integrate edge computing for local signal classification and the central cloud server 102 (cloud ANN model) for large-scale anomaly detection. The trained edge ANN model 232 allows AI-enhanced spectrum monitoring enhanced real-time threat detection, dynamic signal classification, cross-band interference mitigation, and autonomous spectrum adaptation. By leveraging the Peltbeam's ANN model, such as the edge ANN model 232, wireless spectrum monitoring, signal identification, and interference analysis may be significantly enhanced across a wide range of frequency bands (DC to 300 GHz). The edge ANN model 232 may be periodically updated by the global ANN model 316.

Figure 3:
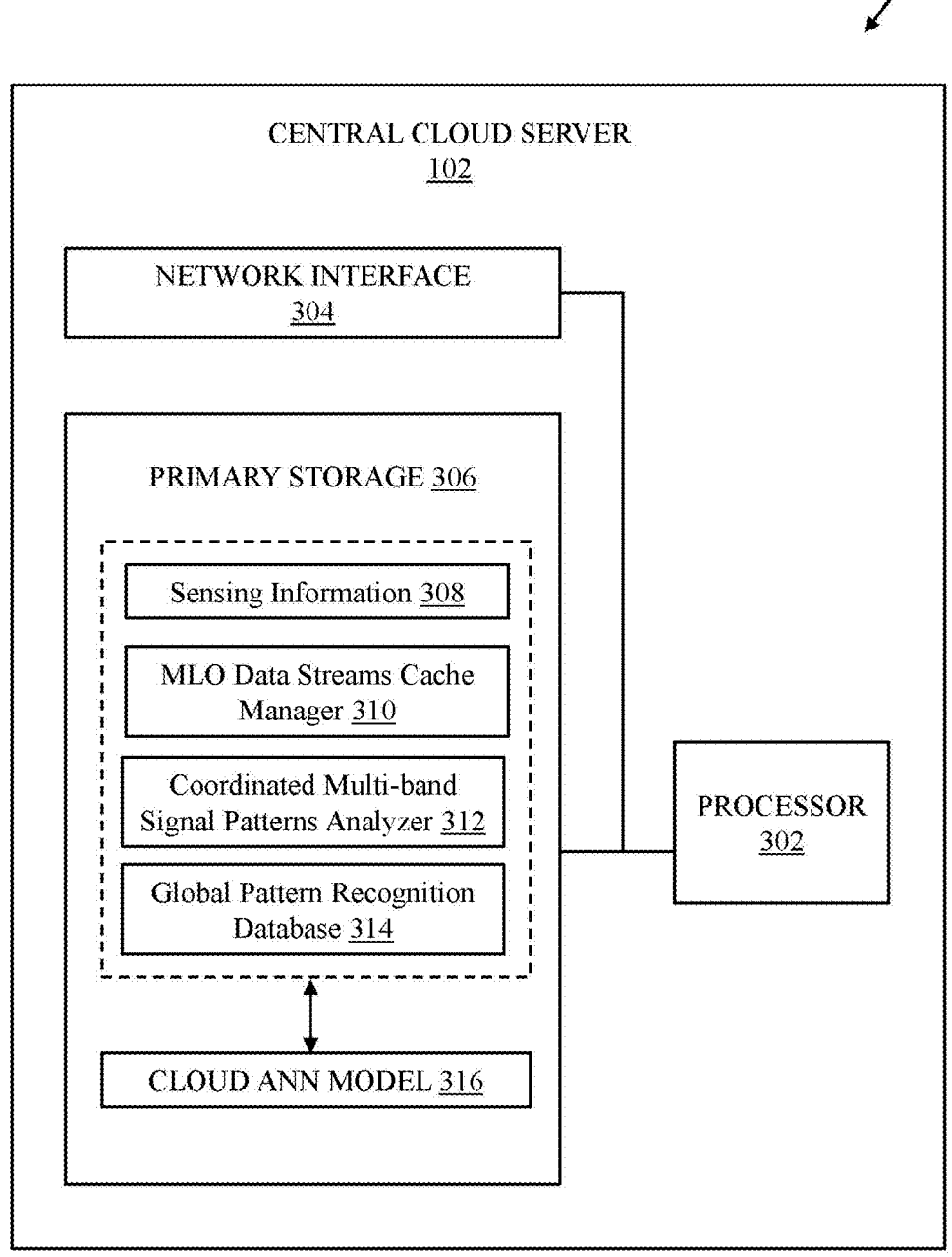
FIG. 3 is a block diagram that illustrates various components of an exemplary central cloud server for distributed spectrum monitoring, in accordance with an exemplary embodiment of the disclosure.

FIG. 3 is a block diagram that illustrates various components of an exemplary central cloud server for distributed spectrum monitoring, in accordance with an exemplary embodiment of the disclosure. FIG. 3 is explained in conjunction with elements from FIGS. 1A, 1B, and 2. With reference to FIG. 3, there is shown a block diagram 300 of the central cloud server 102. The central cloud server 102 may include a processor 302, a network interface 304, and a primary storage 306. The primary storage 306 may further include sensing information 308, a multi-link operations (MLO) data streams cache manager 310, a coordinated multi-band signal patterns analyzer 312, and a global pattern recognition database 314. The central cloud server 102 may further include a cloud artificial neural network (ANN) model 316.

In accordance with an embodiment, the processor 302 of the central cloud server 102 may be configured to obtain MLO data streams 108A, 108B, . . . , 108N from a plurality of wireless communication devices (e.g., the wireless communication devices 104A, 104B, . . . , 104N) distributed across a plurality of different spatial locations (e.g., the spatial locations 106A, 106B, . . . , 106N). Each wireless communication device of the plurality of wireless communication devices (e.g., the wireless communication devices 104A, 104B, . . . , 104N) may be configured to concurrently operate at a plurality of different predetermined intermediate frequency bands. The plurality of different predetermined intermediate frequency bands may comprise at least two of: 2.4 gigahertz (GHz) band, 5 GHz band, 6 GHz band, 7 GHz band, or an unlicensed frequency band. The MLO data streams 108A, 108B, . . . , 108N may comprise synchronized signal information captured concurrently across the plurality of different predetermined intermediate frequency bands (e.g., 5 GHz and 6 GHz bands) by each of the wireless communication devices 104A, 104B, . . . , 104N. Each MLO data stream may include signal characteristics, such as power levels, frequency information, phase relationships, timing data, channel measurements, and interference patterns, that may be concurrently captured from different frequency bands utilizing the MLO feature in each of the wireless communication devices 104A, 104B, . . . , 104N. The MLO data streams 108A, 108B, . . . , 108N may further comprise time-stamped measurements, spatial information corresponding to the device locations (e.g., the spatial locations 106A, 106B, . . . , 106N), and band-specific signal parameters that may enable correlation of signal patterns across frequency and spatial domains. Each wireless communication device of the plurality of wireless communication devices (e.g., the wireless communication devices 104A, 104B, . . . , 104N) may be configured to generate its corresponding MLO data stream by first capturing raw RF signals from DC to 300 GHz, down-converting these signals to predetermined intermediate frequencies (e.g., 5 GHz and 6 GHz) that may be processed by the WLAN chipset (e.g., Wi-Fi® 7 chipset) and performing local signal analysis to extract relevant features (described in detail, for example, in FIG. 2). The MLO data streams cache manager 310 may store the MLO data streams 108A, 108B, . . . , 108N received via the network interface 304.

In accordance with an embodiment, the processor 302 may be further configured to synchronize the obtained MLO data streams 108A, 108B, . . . , 108N from the plurality of wireless communication devices (e.g., the wireless communication devices 104A, 104B, . . . , 104N) distributed across the plurality of different spatial locations (e.g., the spatial locations 106A, 106B, . . . 106N). The obtained MLO data streams 108A, 108B, . . . , 108N may be synchronized using a common timing reference to maintain temporal coherence across the distributed wireless communication devices (e.g., the wireless communication devices 104A, 104B, . . . , 104N). In an example, the processor 302 may first establish a master timing reference at the central cloud server 102 and distribute synchronization signals to the plurality of wireless communication devices 104A, 104B, . . . , 104N. The processor 302 may then measure round-trip timing delays to each wireless communication device based on their respective spatial locations 106A, 106B, . . . , 106N, and calculate relative timing offsets based on the known distances between the wireless communication devices and signal propagation characteristics. These timing offsets may be used to compensate for propagation delays between the different spatial locations 106A, 106B, . . . , 106N.

In accordance with an embodiment, the processor 302 may implement a time alignment process where the MLO data streams 108A, 108B, . . . , 108N may be temporally aligned using the calculated timing offsets and the master timing reference. The processor 302 may maintain timing synchronization by continuously monitoring timing drift and periodically updating the timing offsets to account for changes in network conditions or device movements. For each MLO data stream, the processor 302 may apply corresponding timing corrections to align the signal samples from different spatial locations to ensure that signal events captured across multiple frequency bands at different locations may be properly correlated in time. The processor 302 may further implement a sliding window mechanism to maintain temporal coherence of the synchronized data streams, enabling accurate cross-correlation analysis for pattern detection across both frequency and spatial domains. This synchronized framework may be useful for detecting (in subsequent processing operations) coordinated signal patterns that may exist simultaneously across multiple frequency bands and spatial locations, as timing misalignment could result in missed pattern detections or false correlations.

In accordance with an embodiment, the MLO data streams cache manager 310 may provide synchronized temporary storage of the MLO data streams 108A, 108B, . . . , 108N from the plurality of wireless communication devices, enabling rapid access to time-aligned historical signal data for a real-time or near real-time pattern detection across the distributed network. The MLO data streams cache manager 310 may maintain precise timing alignment of cached streams while optimizing storage through efficient data retention and cleanup operations, thereby reducing network bandwidth usage and processing delays compared to repeated data transfers or database queries when analyzing patterns that occur over multiple time intervals across different spatial locations. For example, when the central cloud server 102 may need to analyze signal patterns over the last 10 seconds of data from the wireless communication devices 104A, 104B, . . . , 104N, the MLO data streams cache manager 310 may provide immediate access to this time-aligned data from its local cache instead of requesting it again from each wireless communication device. This local caching may reduce system delays and network traffic that would occur if the central cloud server 102 had to repeatedly request historical data from the wireless communication devices or access it from long-term storage each time pattern analysis is performed.

In accordance with an embodiment, the processor 302 may be further configured to perform a cross-correlation between the synchronized MLO data streams 108A, 108B, . . . , 108N. The processor 302 may be configured to perform the cross-correlation between the synchronized MLO data streams 108A, 108B, . . . , 108N based on analysis of the pre-processed signal data already available in the synchronized MLO data streams 108A, 108B, . . . , 108N. Since each MLO data stream may already contain locally processed signal characteristics, frequency information, and phase relationships from multiple frequency bands, the processor 302 may focus on detecting relationships and patterns between these pre-processed streams across different spatial locations. The processor 302 may correlate the time-stamped power levels, frequency information, and phase relationships from each MLO data stream to identify when similar signal patterns appear simultaneously across multiple wireless communication devices. For example, the processor 302 may detect when coordinated power level variations or frequency changes occur at multiple spatial locations within the same time window, indicating potential coordinated transmission patterns.

In accordance with an embodiment, the processor 302 may leverage the band-specific signal parameters and spatial information contained in each MLO data stream to perform multi-dimensional correlation analysis. The processor 302 may compare channel measurements and interference patterns across different frequency bands at each spatial location to detect frequency-hopping sequences or coordinated interference. By analyzing the spatial distribution of correlated signal characteristics, the processor 302 may identify clusters of related signal activities and track how these patterns move across the network of distributed wireless communication devices. This correlation of pre-processed signal characteristics across both frequency bands and spatial locations may enable the detection of sophisticated coordinated transmission patterns that would be difficult to identify through single-node analysis, such as distributed jammers operating across multiple frequency bands or synchronized frequency-hopping transmitters spread across different locations.

In accordance with an embodiment, the processor 302 may be configured to perform the cross-correlation between the synchronized MLO data streams 108A, 108B, . . . , 108N through an optimized hybrid concurrent-sequential operation that may process multiple frequency bands efficiently. The processor 302 may compute correlation matrices Rij(f, τ) for each pair of wireless communication devices "I" and "j", where "f" represents different frequency bands (e.g., 5 GHz, 6 GHz), and "τ" represents time lag between signals. For each synchronized time window, the processor 302 may first concurrently process signal characteristics (e.g., power levels, phase relationships) from each frequency band separately or distinctly, computing Rij(f,τ)=Σ[MLOi(f,τ)×MLOj (f,τ+τ)], where "MLOi(f,τ)" may represent the signal characteristics from device "I" at frequency "f" and time "t". The processor 302 may then sequentially combine these band-specific correlation results to build comprehensive correlation matrices that may capture relationships between signal patterns across the plurality of different predetermined intermediate frequency bands (e.g., 5 GHz and 6 GHz bands) and spatial locations, providing an efficient and technically feasible approach that maintains pattern detection capabilities without requiring impractical computational resources. For example, the processing time may be reduced by approximately N/2 compared to fully concurrent processing of "N" number of device pairs, while maintaining a detection latency of less than 100 millisecond for coordinated pattern identification. In an example, the correlation computation may be performed independently for each frequency band and signal characteristic before being combined to identify coordinated transmission patterns.

For example, consider a scenario with three wireless communication devices 104A, 104B, and 104N, each providing MLO data streams that may include signal characteristics from both 5 GHz and 6 GHz bands. Each wireless communication device may provide MLO data streams that may include signal characteristics from both 5 GHz and 6 GHz bands (e.g., the wireless communication device 104A having 5 GHz data (power_level: −60 dBm, phase: 45°) and 6 GHz data (power_level: −55 dBm, phase: 30°) at time-stamp t1). The processor 302 may first concurrently process the intermediate frequency bands for each device pair, such as correlating 5 GHz data between the wireless communication devices 104A and 104B while concurrently correlating their 6 GHz data and then combining these results before moving to analyze the next device pair (such as the wireless communication devices 104A and 104N, followed by the wireless communication devices 104B and 104N). This hybrid concurrent-sequential operation may be more efficient than attempting to correlate all device pairs and frequency bands concurrently, as it may reduce the computational complexity from handling six different data streams (two bands×three devices) concurrently while still enabling detection of coordinated patterns, such as identifying when the wireless communication devices 104A and 104B manifest highly correlated signal changes across both bands while the patterns of the wireless communication device 104N remain independent. In yet another implementation, the processor 302 may be configured to concurrently perform the cross-correlation between the synchronized MLO data streams 108A, 108B, . . . , 108N, without limiting the scope of the disclosure.

Conventional systems analyze signals from each frequency band independently, making it difficult to detect coordinated transmissions that intentionally distribute their activity across multiple frequency bands and locations. Additionally, the conventional systems may not effectively identify frequency-hopping patterns or synchronized interference sources that maintain specific phase relationships across different bands and spatial locations.

In accordance with an embodiment, for the cross-correlation, the processor 302 may be further configured to determine phase relationships between signals detected in the plurality of different predetermined intermediate frequency bands across the plurality of wireless communication devices (e.g., the wireless communication devices 104A, 104B, . . . , 104N). The processor 302 may leverage the pre-processed phase information already available in each MLO data stream, comparing the relative phase angles between signals detected at different spatial locations within the same frequency band, as well as across different frequency bands. For example, a coordinated transmission might maintain a consistent 45-degree phase difference between its 5 GHz and 6 GHz components across multiple locations. Moreover, by tracking the phase relationships over time, the processor 302 may identify sophisticated signal patterns that would be invisible when analyzing magnitude or frequency characteristics alone. For instance, coordinated jammers might maintain specific phase relationships between their transmissions across different frequency bands to maximize interference, or frequency-hopping transmitters might preserve certain phase relationships as they hop between bands. The phase relationship analysis may be beneficial for distinguishing between legitimate multi-band operations and potential coordinated interference, as legitimate signals typically exhibit random phase relationships while coordinated transmissions often maintain consistent phase patterns across frequency bands and locations. For example, when the wireless communication device 104A detects signals with [5 GHz phase: 45°, 6 GHz phase: 30°], the wireless communication device 104B detects signals with [5 GHz phase: 47°, 6 GHz phase: 32°], and the wireless communication device 104N detects signals with [5 GHz phase: 44°, 6 GHz phase: 31°], the processor 302 may analyze these phase values to identify specific patterns, such as consistent phase differences between 5 GHz and 6 GHz bands (e.g., approximately 15° difference), similar phase relationships appearing at multiple wireless communication devices, or phase patterns that move together across different spatial locations. This phase relationship analysis may be useful because legitimate signals typically show random phase patterns, while coordinated transmitters (e.g., jammers or frequency-hopping signals) may maintain consistent phase relationships as they switch between frequency bands or transmit across multiple spatial locations, thereby enabling the processor 302 to distinguish between legitimate multi-band operations and potential coordinated interference patterns.

Conventional spectrum monitoring systems typically operate with single devices or independent monitoring units, each analyzing signals separately. While some systems may use multiple monitoring devices, they primarily focus on individual signal analysis rather than coordinated pattern detection across frequency bands and locations. When each monitoring device operates with its own independent timing, it becomes almost impossible to accurately detect coordinated patterns that may exist simultaneously across multiple frequency bands and locations.

In accordance with an embodiment, the processor 302 may be further configured to cause the plurality of wireless communication devices (e.g., the wireless communication devices 104A, 104B, . . . , 104N) to maintain a synchronized timing reference across the plurality of wireless communication devices (e.g. to ensure precise time alignment of the MLO data streams 108A, 108B, . . . , 108N for accurate pattern detection across plurality of different intermediate frequency bands and spatial locations). In an implementation, in order to maintain the synchronized timing reference, the processor 302 may designate one wireless communication device from the plurality of wireless communication devices as a timing master, distribute timing signals to all other wireless communication devices. The processor 302 may further cause each wireless communication device to adjust its local timing based on received synchronization signals and periodically update timing corrections to maintain synchronization accuracy. The synchronized timing reference may be useful as it may enable precise correlation of signal patterns across the plurality of different intermediate frequency bands and the plurality of spatial locations concurrently, where a frequency-hopping signal moving from 5 GHz to 6 GHz bands across different spatial locations may be properly detected when all wireless communication devices share precise timing alignment. The timing synchronization may leverage standard Wi-Fi® 7 timing mechanisms, making it cost-effective to implement while enabling precise correlation of the MLO data streams 108A, 108B, . . . , 108N across the distributed network of the wireless communication devices 104A, 104B, . . . , 104N for detection of coordinated transmission patterns.

In accordance with an embodiment, the processor 302 may be further configured to determine relative timing offsets based on known distances between the plurality of wireless communication devices (e.g., the wireless communication devices 104A, 104B, . . . , 104N). The distances between the plurality of wireless communication devices (e.g., the wireless communication devices 104A, 104B, . . . , 104N) may be known from the sensing information 308. The sensing information 308 may comprise the plurality of different spatial locations of each of the wireless communication devices 104A, 104B, . . . , 104N. The central cloud server 102 obtains the sensing information 308 and stores the data points of the sensing information 308. As the sensing information 308 is obtained periodically from various wireless communication devices 104A, 104B, . . . , 104N, all changes in the surroundings of each device may be adequately captured and relayed to the central cloud server 102. For example, if the wireless communication device 104A is located 300 meters from the wireless communication device 104B, the processor 302 may calculate the signal propagation delay (approximately 1 microsecond per 300 meters) and use the signal propagation delay calculation to determine the timing offset between the wireless communication devices 104A and 104B. The processor 302 may store a distance matrix for the plurality of wireless communication devices (e.g., the wireless communication devices 104A, 104B, . . . , 104N) and convert the known distances to expected signal propagation delays, generate a timing offset table for each pair of wireless communication devices, and adjust the relative timing offsets based on measured delays. The processor 302 may be further configured to merge correlation results associated with the cross-correlation between the synchronized MLO data streams 108A, 108B, . . . , 108N based on the determined relative timing offsets. For example, for the correlation of the MLO data streams 108A and 108B from the wireless communication devices 104A and 104B, the processor 302 may shift the timing of signals from the wireless communication device 104B by a calculated offset (e.g., 1 microsecond for 300 meters distance) before performing the correlation computation. The offset-based correlation merging may be beneficial because it may account for physical signal propagation delays, enabling the processor 302 to properly align and correlate signals detected at the plurality of different spatial locations (e.g., the spatial locations 106A, 106B, . . . , 106N) even when actual signal arrival times differ due to varying distances between the plurality of wireless communication devices (e.g., the wireless communication devices 104A, 104B, . . . , 104N).

In accordance with an embodiment, the processor 302 may be further configured to detect frequency-hopping patterns across the plurality of different predetermined intermediate frequency bands based on correlation of temporal signal characteristics across the synchronized MLO data streams 108A, 108B, . . . , 108N. The processor 302 may detect frequency-hopping patterns by leveraging the spatial diversity provided by the plurality of wireless communication devices distributed across the plurality of different spatial locations. For example, when a frequency-hopping signal moves from 5 GHz to 6 GHz bands, the wireless communication device 104A may detect a strong signal at 5 GHz that suddenly disappears while the wireless communication device 104B concurrently detects a new signal appearing at 6 GHz. The distributed spatial sensing may confirm the hopping pattern and facilitate determining the direction of signal movement. The processor 302 may correlate these spatial-temporal signal characteristics across the synchronized MLO data streams 108A, 108B, . . . , 108N to build a comprehensive view of the frequency-hopping pattern, including its spatial propagation path, hopping sequence, and timing intervals. This distributed sensing approach may enable more accurate detection of frequency-hopping patterns because multiple wireless communication devices may collectively validate the pattern detection, reduce false positives from local interference, and provide spatial context about the signal source's location and movement that would not be available from a single monitoring point. For example, at time t1, the wireless communication device 104A may detect a strong signal (−40 dBm) at 5 GHz while detecting no signal at 6 GHz, the wireless communication device 104B may detect the same signal at −45 dBm at 5 GHz, and the wireless communication device 104C may detect it at −50 dBm at 5 GHz. Subsequently at time t2 (1 ms later), the wireless communication device 104A may detect no signal at 5 GHz but a signal at 6 GHz (−45 dBm), the wireless communication device 104B may detect the strongest signal at 6 GHz (−40 dBm), and the wireless communication device 104C may detect the signal at 6 GHz (−45 dBm). The processor 302 may correlate these MLO data streams to determine the frequency hop sequence (5 GHz→6 GHz→5 GHz), hop timing interval (1 ms), and signal source movement based on signal strength variations across the plurality of wireless communication devices. Such a distributed approach may enable more accurate detection because multiple wireless communication devices may collectively validate the pattern and provide spatial context about the signal source's location and movement.

In accordance with an embodiment, the processor 302 may be further configured to detect coordinated multi-band signal patterns that exist concurrently across the plurality of different predetermined intermediate frequency bands at the plurality of different spatial locations (e.g., the spatial locations 106A, 106B, . . . , 106N), based on the cross-correlation between the synchronized MLO data streams 108A, 108B, . . . , 108N. In an example, the coordinated multi-band signal patterns may refer to signal activities that maintain specific, measurable correlations across multiple frequency bands (e.g., intentional relationships or synchronized behaviors across the 5 GHz and 6 GHz) and multiple spatial locations concurrently. The coordinated multi-band signal patterns may be characterized by quantifiable inter-band relationships (e.g., fixed power level ratios between bands such as consistent −3 dB differences, specific phase offsets between bands such as 45-degree differences, synchronized frequency changes at defined intervals, precise timing correlations between band activities) and spatial coordination aspects (e.g., identical signal patterns detected at multiple locations with known timing offsets, mathematically correlated signal strength distributions across devices, consistent phase relationships maintained across locations, synchronized timing characteristics across spatial points). For example, a coordinated multi-band signal pattern may exist when a signal maintains a constant −3 dB power ratio between 5 GHz and 6 GHz bands across all locations, or when multiple transmissions show precisely timed frequency changes across bands, or when a system maintains fixed phase offsets between bands while operating from different locations. The measurable correlations may distinguish such patterns from random or independent signal activities occurring across the plurality of different intermediate frequency bands and the plurality of different spatial locations.

In accordance with an embodiment, the processor 302 may be configured to detect the coordinated multi-band signal patterns by analyzing synchronized MLO data streams 108A, 108B, . . . , 108N that may capture signal characteristics concurrently across the plurality of different intermediate frequency bands and the plurality of different spatial locations. The coordinated multi-band signal patterns analyzer 312 may be executed by the processor 302 to detect the coordinated multi-band signal patterns. The coordinated multi-band signal patterns may manifest in multiple ways. For example, a sophisticated transmitter might split its signal across both 5 GHz and 6 GHz bands with specific power ratios (e.g., maintaining a constant −3 dB difference between bands) while transmitting from multiple locations concurrently. At time t1, the wireless communication device 104A may detect [5 GHz: −40 dBm, 6 GHz: −43 dBm], wireless communication device 104B may detect [5 GHz: −42 dBm, 6 GHz: −45 dBm], and wireless communication device 104C may detect [5 GHz: −41 dBm, 6 GHz: −44 dBm], all maintaining the same −3 dB relationship between bands despite different absolute power levels. The cross-correlation between the synchronized MLO data streams 108A, 108B, . . . , 108N may reveal these coordinated patterns through multiple signal characteristics. The processor 302 may analyze temporal relationships (e.g., synchronized phase changes across bands), spectral relationships (e.g., consistent frequency offsets or power ratios between bands), and spatial relationships (e.g., signal strength distributions across devices) concurrently. For example, a coordinated transmission might maintain specific phase relationships, such as a constant 45-degree phase difference between 5 GHz and 6 GHz components, across all spatial locations. The processor 302 may detect this by correlating phase data from the synchronized MLO data streams 108A, 108B, . . . , 108N where wireless communication device 104A shows [5 GHz phase: 30°, 6 GHz phase: 75°], wireless communication device 104B shows [5 GHz phase: 45°, 6 GHz phase: 90°], and wireless communication device 104C shows [5 GHz phase: 60°, 6 GHz phase: 105°], all maintaining the 45-degree inter-band phase difference despite varying absolute phases.

In accordance with an embodiment, the processor 302 may leverage the MLO capability of WLAN chipset (Wi-Fi® 7 chipset) in the plurality of wireless communication devices (e.g., the wireless communication devices 104A, 104B, . . . , 104N) to perform concurrent correlation across both frequency and spatial domains by creating correlation matrices that capture relationships between signal characteristics across both dimensions concurrently. For example, when detecting a distributed interference source, the processor 302 may observe coordinated power level variations wherein the total power across both bands remains constant (e.g., −37 dBm) at each location but the distribution between bands varies in a specific pattern, such that at time t1, the wireless communication device 104A may detect [5 GHz: −40 dBm, 6 GHz: −43 dBm], the wireless communication device 104B may detect [5 GHz: −43 dBm, 6 GHz: −40 dBm], and the wireless communication device 104C may detect [5 GHz: −41 dBm, 6 GHz: −42 dBm], while at time t2, the pattern shifts such that the wireless communication device 104A detects [5 GHz: −43 dBm, 6 GHz: −40 dBm], the wireless communication device 104B detects [5 GHz: −40 dBm, 6 GHz: −43 dBm], and the wireless communication device 104C detects [5 GHz: −42 dBm, 6 GHz: −41 dBm], all while maintaining the same total power of −37 dBm at each location. Beneficially, the multi-dimensional correlation capability may be useful due to its exploitation of MLO feature in a distributed monitoring architecture, as such coordinated multi-band patterns would be impossible to detect without concurrent or the hybrid concurrent-sequential operation-based monitoring across the plurality of different intermediate frequency bands and the plurality of different spatial locations, such as the spatial locations 106A, 106B, . . . , 106N.

In accordance with an embodiment, the processor 302 may be further configured to generate control signals to dynamically adjust one or more monitoring parameters of the plurality of wireless communication devices (e.g., the wireless communication devices 104A, 104B, . . . , 104N) distributed across the plurality of different spatial locations (e.g., the spatial locations 106A, 106B, . . . , 106N) based on the coordinated multi-band signal patterns. The one or more monitoring parameters of the plurality of wireless communication devices (e.g., the wireless communication devices 104A, 104B, . . . , 104N) may include signal detection parameters (e.g., power level detection thresholds for different frequency bands, phase measurement thresholds, frequency detection ranges within each band), timing parameters (e.g., sampling rates for signal measurements, duration of monitoring in each intermediate frequency band, synchronization update intervals), or spatial coverage parameters (e.g., frequency band assignments for each wireless communication device, primary and secondary band monitoring responsibilities, monitoring duty cycles for different bands). The one or more monitoring parameters may be dynamically adjusted by the processor 302 to continuously or periodically optimize the detection of coordinated multi-band signal patterns across the plurality of different spatial locations. The processor 302 may adjust the one or more monitoring parameters individually or in groups based on the characteristics of detected signal patterns, enabling adaptive and efficient monitoring across the distributed network of wireless communication devices. For example, when the processor 302 may detect a pattern where signal strength alternates between 5 GHz and 6 GHz bands with specific timing characteristics (e.g., lms intervals), the processor 302 may generate control signals to adjust the monitoring parameters such as sampling rates (e.g., changing from 2 ms to lms to match pattern timing), frequency band focus (e.g., directing the wireless communication device 104A to increase sensitivity in 5 GHz band while directing the wireless communication device 104B to focus on 6 GHz band), signal detection thresholds (e.g., adjusting from −60 dBm to −70 dBm), and spatial coverage coordination parameters across the plurality of wireless communication devices. Such dynamic adjustments may enable optimized monitoring coverage and enhanced pattern detection capabilities across the distributed network of the wireless communication devices 104A, 104B, . . . 104N.

In accordance with an embodiment, the processor 302 may be further configured to identify, from the detected coordinated multi-band signal patterns, one or more spatially coordinated transmission patterns based on the determined phase relationships. The one or more spatially coordinated transmission patterns may refer to signal activities that show synchronized behaviors across the plurality of different spatial locations while maintaining specific phase relationships between transmissions. The processor 302 may identify spatially coordinated transmission patterns by analyzing how phase relationships in the detected coordinated multi-band signal patterns are maintained across the plurality of wireless communication devices, such as the wireless communication devices 104A, 104B, . . . , 104N. For example, the processor 302 may identify a spatially coordinated pattern when each wireless communication device detects the same inter-band phase relationship (e.g., a consistent 45-degree offset between 5 GHz and 6 GHz bands) while also maintaining a fixed progressive phase shift across devices (e.g., for the wireless communication device 104A: [5 GHz: 0°, 6 GHz: 45°], for the wireless communication device 104B: [5 GHz: 30°, 6 GHz: 75°], for the wireless communication device 104N: [5 GHz: 60°, 6 GHz: 105°]). Beneficially, the concurrent detection of both types of phase coordination, i.e., the fixed offset between the plurality of intermediate frequency bands and the progressive shift across the plurality of different spatial locations (enabled by the MLO feature in a distributed architecture), may reveal coordinated transmissions that would appear as unrelated signals to conventional systems that can only analyze phase relationships either between bands or across locations, but not both concurrently in an example.

In accordance with an embodiment, the processor 302 may be further configured to classify the detected coordinated multi-band signal patterns and the one or more spatially coordinated transmission patterns as either legitimate multi-band operations or potential coordinated interference. For example, when analyzing an MLO data stream showing concurrent activity in 5 GHz and 6 GHz bands, the processor 302 may classify it as legitimate multi-band operation if it exhibits characteristics, such as standard WLAN (Wi-Fi®) frame structures in both bands, power levels within Wi-Fi® specifications (e.g., −40 dBm to −70 dBm range), expected phase relationships between bands, or known spatial coverage patterns, and the like. Conversely, the processor 302 may classify patterns as potential coordinated interference when detecting measurable deviations in timing correlations between different intermediate frequency bands, unusual power level relationships (e.g., constant total power across bands regardless of distance, unexpected phase progressions across spatial locations, or coordinated pattern changes that don't follow WLAN (e.g., Wi-Fi®) protocols.

In an example, the processor 302 may classify detected patterns by analyzing quantifiable signal characteristics, where the multi-band operations may be identified when the wireless communication devices detect signals indicative of power levels that decrease according to standard path loss models (e.g., the wireless communication device 104A: [5 GHz: −45 dBm, 6 GHz: −50 dBm], the wireless communication device 104B at 10 m distance: [5 GHz: −55 dBm, 6 GHz: −60 dBm]), frame structures matching Wi-Fi® 7 specifications, and phase relationships within defined Wi-Fi® 7 MLO operational parameters. The processor 302 may classify patterns as potential coordinated interference when detecting measurable deviations such as constant total power maintained across locations regardless of distance (e.g., some wireless communication devices indicative of −37 dBm total power but with coordinated power shifts between 5 GHz and 6 GHz bands), phase progressions outside Wi-Fi® 7 MLO operational ranges, or frame timing intervals that do not match Wi-Fi® 7 specifications. The classification capability may be enabled by the system's ability to analyze multiple signal characteristics concurrently across both frequency bands and spatial locations.

In accordance with an embodiment, the processor 302 may be further configured to execute the global ANN model 316 to classify the detected coordinated multi-band signal patterns and the one or more spatially coordinated transmission patterns as either legitimate multi-band operations or potential coordinated interference. The classification results may be stored back in the global pattern recognition database 314 for future reference, enabling continuous learning and improved pattern recognition across the distributed spectrum monitoring network.

In accordance with an embodiment, the training of the global ANN model 316 may involve a multi-phase approach that may begin with supervised learning using approximately 5,000 labeled examples of legitimate multi-band operations (e.g., legitimate Wi-Fi® 7 MLO operations) and about 3,000 examples of known interference patterns with specific coordination characteristics across frequency bands and spatial locations. This initial phase may utilize backpropagation with gradient descent to optimize the global ANN model 316 parameters, followed by transfer learning techniques to incorporate pre-trained neural network layers from related signal processing domains. To maximize learning efficiency with this limited labeled dataset, the processor 302 may implement semi-supervised learning where the 8,000 labeled patterns may be combined with over 100,000 unlabeled MLO data streams 108A, 108B, . . . , 108N collected from the distributed network, employing techniques such as pseudo-labeling where the model assigns provisional labels to unlabeled data with confidence scores above 85%. The global ANN model 316 may then transition to primarily to unsupervised learning for ongoing adaptation, where clustering algorithms may identify 8-12 natural groupings in the MLO data streams 108A, 108B, . . . , 108N, autoencoders with 5 encoding layers may learn compressed representations of normal patterns, and anomaly detection mechanisms may identify deviations exceeding, for example, 2.5 standard deviations from established pattern clusters. The processor 302 may implement continuous online learning capabilities where the global ANN model 316 may adjust its parameters based on approximately, for example, 10,00 to 10000 new MLO data streams per day or week using a 30-day sliding window approach to maintain relevance to current RF environment conditions, with reinforcement mechanisms strengthening recognition of patterns that are consistently classified with confidence scores above 90%. This comprehensive training approach may enable the global ANN model 316 to effectively classify both known and novel coordinated multi-band signal patterns with accuracy rates exceeding 95-99% for known patterns and 90-98% for novel patterns, maintaining high performance even as the RF environment evolves without requiring extensive manual retraining.

In accordance with an embodiment, the processor 302 may be further configured to compare the detected coordinated multi-band signal patterns against a pattern recognition database, such as the global pattern recognition database 314 of known signal patterns. The processor 302 may be further configured to identify previously unknown relationships between signals detected across the plurality of different predetermined intermediate frequency bands and the plurality of different spatial locations (e.g., the spatial locations 106A, 106B, . . . , 106N). The processor 302 may identify previously unknown relationships by leveraging synchronized MLO data streams 108A, 108B, . . . , 108N across the distributed network, where while the global pattern recognition database 314 may contain known patterns with simple characteristics like power variations or frequency hopping, the processor 302 may discover more complex, multi-dimensional relationships. For example, the processor 302 may identify patterns where power ratios between 5 GHz and 6 GHz bands follow specific mathematical correlations across locations (e.g., the spatial location 106A: [5 GHz: −40 dBm, 6 GHz: −43 dBm], the spatial location 106B: [5 GHz: −43 dBm, 6 GHz: −40 dBm], following structured spatial progression), while simultaneously maintaining precise phase relationships (e.g., 45-degree offset between bands with 30-degree progressive shift per location) and coordinated timing patterns across both frequency bands and spatial locations. This may enable real-time identification of sophisticated coordinated transmission patterns that would be invisible when analyzed in individual domains.

In accordance with an embodiment, the processor 302 may be further configured to adjust pattern detection parameters based on the identified previously unknown relationships between the signals detected across the plurality of different predetermined intermediate frequency bands and the plurality of different spatial locations (e.g., the spatial locations 106A, 106B, . . . , 106N). The processor 302 may adjust pattern detection parameters specifically to enhance detection of coordinated multi-band signal patterns based on newly identified relationships between signals. In an example, the initial pattern detection parameters may be power level detection thresholds: −70 dBm for each band independently, phase difference tolerance: ±10 degrees between band measurements, timing correlation window: 5 ms for correlation analysis, or spatial correlation distance: 100 m between two wireless communication devices. The newly identified pattern may be coordinated multi-band signal patterns indicative of precise power ratios between different intermediate frequency bands, fixed phase offsets across locations, or specific timing relationships. The processor 302 may refine the pattern detection parameters specifically to target these coordinated characteristics. For example, the pattern detection parameters may be updated when it detects coordinated patterns such as constant power ratios maintained between 5 GHz and 6 GHz bands across all spatial locations, fixed phase offsets between bands that show consistent progression across locations, or precise timing coordination between band activities that indicate coordinated transmission patterns. The adjusted pattern detection parameters may be power level detection parameters that may be adjusted to track power ratios instead of absolute levels or updated thresholds to detect subtle band-to-band relationships. The adjusted pattern detection parameters may further include phase monitoring parameters that may tighten phase difference tolerance to, for example, ±5 degrees or may add monitoring for progressive phase shifts across locations. The adjusted pattern detection parameters may further include timing window parameters that may adjust correlation windows to match observed pattern timing or may update synchronization requirements based on spatial distribution. For example, when the processor 302 identifies a new pattern showing precise power ratios between 5 GHz and 6 GHz bands (e.g., consistent −3 dB difference) across multiple locations, it may adjust power detection thresholds to specifically monitor for these band-to-band power relationships rather than absolute power levels. Similarly, upon detecting fixed phase offsets between bands (e.g., 45-degree offset) with progressive spatial shifts (e.g., 30-degree shift per location), the processor 302 may tighten phase difference tolerances from ±10 degrees to ±5 degrees and add specific monitoring for these spatial phase progressions. The processor 302 may also adjust timing correlation windows and spatial correlation distances to match newly observed pattern characteristics, thereby enhancing the system's ability to detect similar sophisticated patterns in future spectrum monitoring operations.

In accordance with an embodiment, the processor 302 may be further configured to generate threat assessments based on the detected coordinated multi-band signal patterns. The processor 302 may be further configured to control one or more wireless communication devices of the plurality of wireless communication devices (e.g., the wireless communication devices 104A, 104B, . . . , 104N) trigger one or more operational responses based on the generated threat assessments. The processor 302 may be configured to generate the threat assessments by analyzing the coordinated multi-band signal patterns detected across the distributed network, where patterns indicating threats may include coordinated jamming across frequency bands, synchronized interference across locations, or behavioral anomalies (i.e., the measured deviations) identified by the global ANN model 316. Based on these assessments, the processor 302 may control the plurality of wireless communication devices to trigger operational responses, such as directing specific devices to switch frequency bands or adjust polarization types to maintain communication performance, modifying monitoring parameters to track evolving threats, or coordinating spectrum resource reallocation across the distributed network to minimize interference impact. This centralized threat assessment and response capability may be uniquely enabled by the system's ability to detect and analyze coordinated patterns across the plurality of different intermediate frequency bands and the plurality of different spatial locations concurrently, allowing for more effective threat mitigation than traditional single-device or single-band monitoring approaches.

In accordance with an embodiment, the processor 302 may be further configured to generate one or more radio frequency environment maps based on the detected coordinated multi-band signal patterns. The one or more radio frequency environment maps may refer to a comprehensive visualization of signal characteristics (such as power levels, phase relationships, timing patterns) across the plurality of different intermediate frequency bands (e.g., 5 GHz and 6 GHz) and the plurality of different spatial locations. The one or more radio frequency environment maps may be a multi-dimensional representation of the RF spectrum usage across the monitored area. The one or more radio frequency environment maps may include a comprehensive multi-dimensional visualization that displays signal characteristics across the plurality of different intermediate frequency bands and the plurality of different spatial locations concurrently. For example, the one or more radio frequency environment maps may present a color-coded heat map where 5 GHz band signal power is represented by a first colored (e.g., red) intensity gradients and 6 GHz band power by a second colored (e.g., blue) intensity gradients across the monitored area, with another color-highlighted regions may be indicative where coordinated multi-band patterns are detected. The one or more radio frequency environment maps may further overlay directional vectors showing signal movement patterns, contour lines representing phase relationship distributions, numerical indicators of power ratios between bands at key locations, and specially marked clusters where multiple wireless communication devices detect the same coordinated pattern (e.g., the wireless communication device 104A, 104B, . . . , 104N all detecting a constant-3 dB power difference between bands with 45-degree phase offset). Additionally, the one or more radio frequency environment maps may include temporal sliders allowing visualization of how these patterns evolve over time, and threat assessment indicators highlighting areas where pattern classification suggests potential coordinated interference, providing network administrators with actionable insights for spectrum management and threat mitigation. The processor 302 may be further configured to identify, within the one or more radio frequency environment maps, spatial clusters of signal sources that operate across the plurality of different predetermined intermediate frequency bands. The spatial clusters of signal sources may refer to groupings of coordinated signal activities that exhibit similar characteristics across multiple intermediate frequency bands while being concentrated in specific geographic areas. These clusters may represent groups of transmitters or jammers that operate in a coordinated manner across the 5 GHz and 6 GHz bands with specific spatial relationships. The processor 302 may identify the spatial clusters within RF environment maps based on one or more of: proximity analysis to detect related signal sources within close physical proximity, pattern similarity detection to group sources with matching coordination characteristics (e.g., same power ratio between 5 GHz and 6 GHz bands), signal strength gradient analysis to identify common origins for multi-band transmissions, or temporal correlation to find sources with synchronized timing patterns across bands within specific regions. For example, when wireless communication devices 104A, 104B, . . . , 104N (located within 50 or 100 meters of each other) all detect signal sources with matching power ratios between frequency bands and identical phase relationships, the processor 302 may identify this as a spatial cluster, suggesting these signals originate from multiple transmitters operating in coordination within that specific area.

Unlike traditional systems that can only identify signal clusters based on single-band characteristics or simple proximity, the processor 302 may leverage synchronized MLO data streams 108A, 108B, . . . , 108N from distributed wireless communication devices to identify sophisticated spatial clusters exhibiting complex cross-band relationships. These spatial clusters may reveal previously undetectable coordinated network activities, such as distributed mesh networks operating with frequency-coordinated protocols across multiple nodes, synchronized frequency-hopping transmitters designed to appear as independent signals to conventional monitors, or sophisticated interference sources using spatial diversity to maintain consistent impact across frequency bands.

In accordance with an embodiment, the processor 302 may be further configured to track movement of the signal sources identified across the plurality of different spatial locations (e.g., the spatial locations 106A, 106B, . . . , 106N). The processor 302 may track movement of identified signal sources across spatial locations by leveraging the system's distributed monitoring capabilities and temporal correlation of the MLO data streams 108A, 108B, . . . , 108N. The processor 302 may construct movement trajectories by correlating the appearance, disappearance, and strength variations of coordinated multi-band signal patterns across different wireless communication devices over time. For example, when a coordinated pattern with characteristic-3 dB power ratio between 5 GHz and 6 GHz bands is initially detected by the wireless communication device 104A, then appears at the wireless communication device 104B with increasing strength while diminishing at the wireless communication device 104A, the processor 302 may determine movement direction and approximate velocity of the signal source. This movement tracking capability may be enhanced by the system's ability to maintain coordination pattern recognition across different locations, such as the spatial locations 106A, 106B, . . . , 106N, enabling trajectory mapping even as signal strength varies with distance. The tracking of the signals based on their coordinated multi-band signatures rather than single-band characteristics may be beneficial, which may allow differentiation between moving sources that would appear as unrelated signals to traditional monitoring systems that track only single-band characteristics.

Figure 4B:
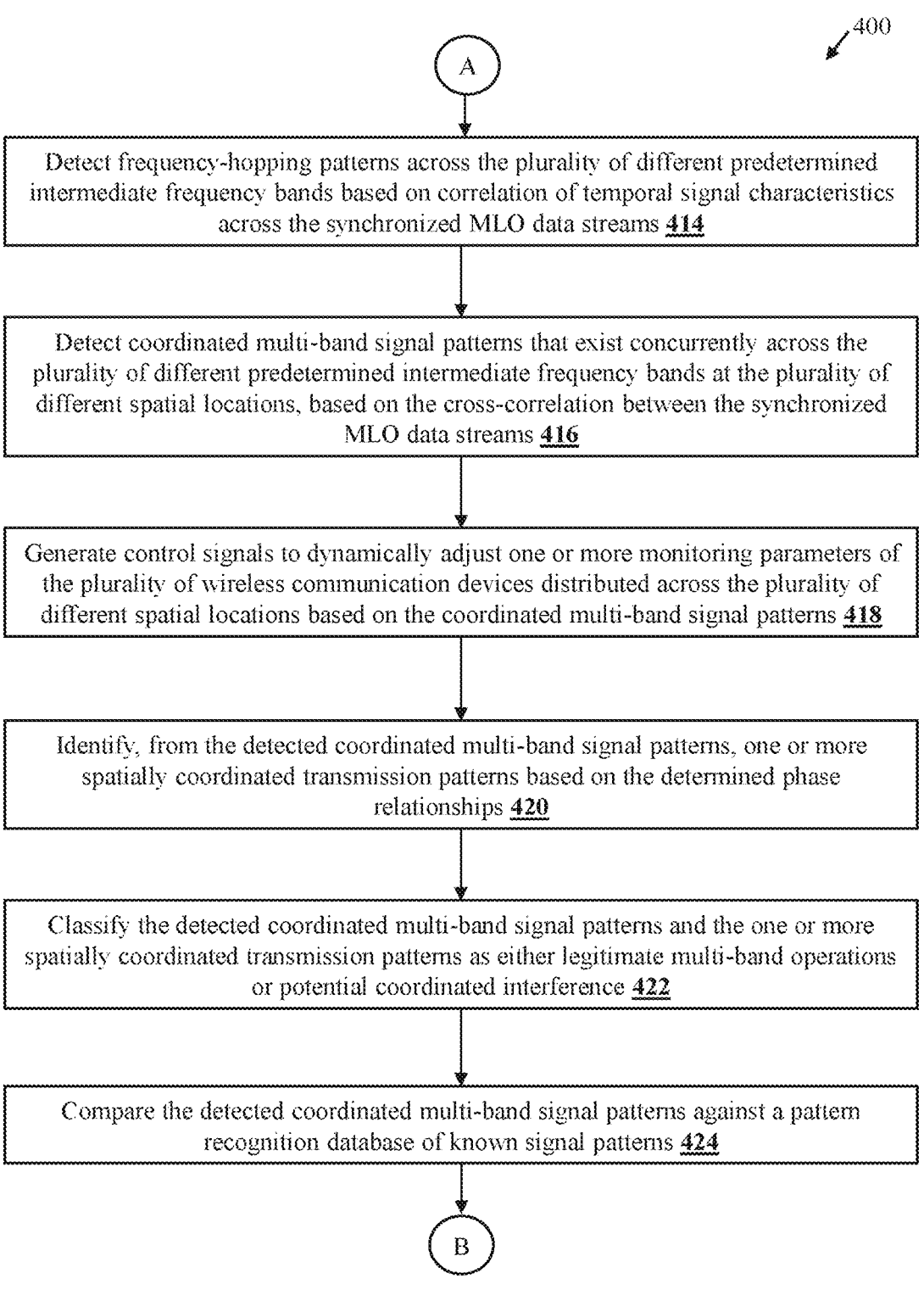
Figure 4C:
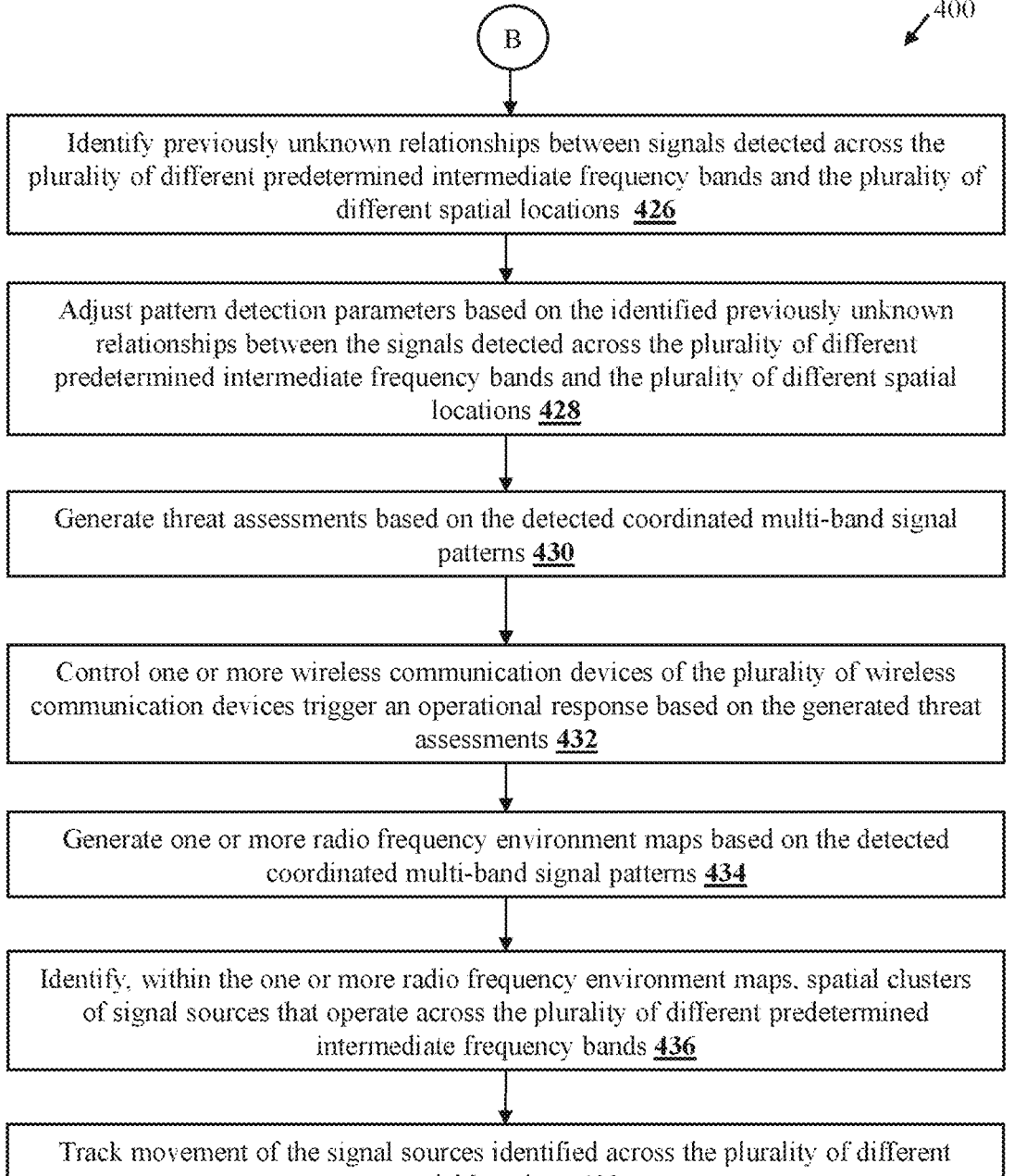

FIGS. 4A, 4B, and 4C collectively, is a flowchart of a method for distributed spectrum monitoring, in accordance with an embodiment of the disclosure. FIGS. 4A, 4B, and 4C are explained in conjunction with elements from FIGS. 1A, 1B, 2, and 3. With reference to 4A, 4B, and 4C, there is shown a flowchart of a method 400 comprising exemplary operations 402 through 438. The method 400 may be implemented in the central cloud server 102.

At 402, multi-link operation (MLO) data streams 108A, 108B, . . . , 108N may be obtained from the plurality of wireless communication devices (e.g., the wireless communication devices 104A, 104B, . . . , 104N) distributed across the plurality of different spatial locations (e.g., the spatial locations 106A, 106B, . . . , 106N). Each wireless communication device of the plurality of wireless communication devices may be configured to concurrently operate at a plurality of different predetermined intermediate frequency bands.

At 404, the obtained MLO data streams 108A, 108B, . . . , 108N from the plurality of wireless communication devices (e.g., the wireless communication devices 104A, 104B, . . . , 104N) distributed across the plurality of different spatial locations, may be synchronized.

At 406, a cross-correlation may be performed between the synchronized MLO data streams 108A, 108B, . . . , 108N. The operation 406 may include one or more sub-operations, such as operation 406A. At 406A, phase relationships may be determined between signals detected in the plurality of different predetermined intermediate frequency bands across the plurality of wireless communication devices (e.g., the wireless communication devices 104A, 104B, . . . , 104N).

At 408, the plurality of wireless communication devices (e.g., the wireless communication devices 104A, 104B, . . . , 104N) may be caused (e.g., by the central cloud server 102) to maintain a synchronized timing reference across the plurality of wireless communication devices.

At 410, relative timing offsets may be determined based on known distances between the plurality of wireless communication devices (e.g., the wireless communication devices 104A, 104B, . . . , 104N).

At 412, correlation results associated with the cross-correlation between the synchronized MLO data streams 108A, 108B, . . . , 108N may be merged based on the determined relative timing offsets.

At 414, frequency-hopping patterns may be detected across the plurality of different predetermined intermediate frequency bands based on correlation of temporal signal characteristics across the synchronized MLO data streams 108A, 108B, . . . , 108N.

At 416, coordinated multi-band signal patterns that exist concurrently across the plurality of different predetermined intermediate frequency bands may be detected at the plurality of different spatial locations (e.g., the spatial locations 106A, 106B, . . . , 106N), based on the cross-correlation between the synchronized MLO data streams 108A, 108B, . . . , 108N.

At 418, control signals may be generated to dynamically adjust one or more monitoring parameters of the plurality of wireless communication devices (e.g., the wireless communication devices 104A, 104B, . . . , 104N) distributed across the plurality of different spatial locations (e.g., the spatial locations 106A, 106B, . . . , 106N) based on the coordinated multi-band signal patterns.

At 420, one or more spatially coordinated transmission patterns may be identified from the detected coordinated multi-band signal patterns, based on the determined phase relationships.

At 422, the detected coordinated multi-band signal patterns and the one or more spatially coordinated transmission patterns may be classified as either legitimate multi-band operations or potential coordinated interference.

At 424, the detected coordinated multi-band signal patterns may be compared against a pattern recognition database, such as the global pattern recognition database 314 of known signal patterns.

At 426, previously unknown relationships may be identified between signals detected across the plurality of different predetermined intermediate frequency bands and the plurality of different spatial locations (e.g., the spatial locations 106A, 106B, . . . , 106N).

At 428, pattern detection parameters may be adjusted based on the identified previously unknown relationships between the signals detected across the plurality of different predetermined intermediate frequency bands and the plurality of different spatial locations (i.e., the spatial locations 106A, 106B, . . . , 106N).

At 430, threat assessments may be generated based on the detected coordinated multi-band signal patterns.

At 432, one or more wireless communication devices of the plurality of wireless communication devices (e.g., the wireless communication devices 104A, 104B, . . . , 104N) may be controlled to trigger one or more operational responses based on the generated threat assessments.

At 434, one or more radio frequency environment maps may be generated based on the detected coordinated multi-band signal patterns.

At 436, spatial clusters of signal sources that operate across the plurality of different predetermined intermediate frequency bands may be identified within the one or more radio frequency environment maps.

At 438, movement of the signal sources identified across the plurality of different spatial locations, may be tracked.

Various embodiments of the disclosure may provide the system 100A or 100B for distributed spectrum monitoring. The system 100A or 100B may include the central cloud server 102 that may include the processor 302. The processor 302 may be configured to obtain multi-link operation (MLO) data streams 108A, 108B, . . . , 108N from the plurality of wireless communication devices distributed across the plurality of different spatial locations (e.g., the spatial locations 106A, 106B, . . . , 106N). Each wireless communication device of the plurality of wireless communication devices may be configured to concurrently operate at a plurality of different predetermined intermediate frequency bands. The processor 302 may be further configured to synchronize the obtained MLO data streams 108A, 108B, . . . , 108N from the plurality of wireless communication devices distributed across the plurality of different spatial locations. The processor 302 may be further configured to perform a cross-correlation between the synchronized MLO data streams 108A, 108B, . . . , 108N. The processor 302 may be further configured to detect coordinated multi-band signal patterns that exist concurrently across the plurality of different predetermined intermediate frequency bands at the plurality of different spatial locations, based on the cross-correlation between the synchronized MLO data streams 108A, 108B, . . . , 108N.

Various embodiments of the disclosure may provide a computer program product for distributed spectrum monitoring, the computer program product comprising a non-transitory computer-readable storage medium having program instructions embodied therewith, the program instructions are executable by a system to cause the system to execute operations, the operations comprising obtaining multi-link operation (MLO) data streams 108A, 108B, . . . , 108N from the plurality of wireless communication devices distributed across the plurality of different spatial locations (e.g., the spatial locations 106A, 106B, . . . , 106N). Each wireless communication device of the plurality of wireless communication devices may be configured to concurrently operate at a plurality of different predetermined intermediate frequency bands. The operations may further comprise synchronizing the obtained MLO data streams 108A, 108B, . . . , 108N from the plurality of wireless communication devices distributed across the plurality of different spatial locations. The operations may further comprise performing a cross-correlation between the synchronized MLO data streams 108A, 108B, . . . , 108N. The operations may further comprise detecting coordinated multi-band signal patterns that exist concurrently across the plurality of different predetermined intermediate frequency bands at the plurality of different spatial locations, based on the cross-correlation between the synchronized MLO data streams 108A, 108B, . . . , 108N.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A system for distributed spectrum monitoring, comprising:

a central cloud server that comprises a processor, wherein the processor is configured to:

obtain multi-link operation (MLO) data streams from a plurality of wireless communication devices distributed across a plurality of different spatial locations, wherein each wireless communication device of the plurality of wireless communication devices is configured to concurrently operate at a plurality of different predetermined intermediate frequency bands;

synchronize the obtained MLO data streams from the plurality of wireless communication devices distributed across the plurality of different spatial locations;

perform a cross-correlation between the synchronized MLO data streams; and cause the plurality of wireless communication devices to maintain a synchronized timing reference across the plurality of wireless communication devices.

2. The system of claim 1, wherein the processor is further configured to detect coordinated multi-band signal patterns that exist concurrently across the plurality of different predetermined intermediate frequency bands at the plurality of different spatial locations, based on the cross-correlation between the synchronized MLO data streams.

3. The system of claim 1, wherein the processor is further configured to determine relative timing offsets based on known distances between the plurality of wireless communication devices.

4. The system of claim 3, wherein the processor is further configured to merge correlation results associated with the cross-correlation between the synchronized MLO data streams based on the determined relative timing offsets.

5. The system of claim 1, wherein the processor is further configured to detect frequency-hopping patterns across the plurality of different predetermined intermediate frequency bands based on correlation of temporal signal characteristics across the synchronized MLO data streams.

6. The system of claim 2, wherein the processor is further configured to generate control signals to dynamically adjust one or more monitoring parameters of the plurality of wireless communication devices distributed across the plurality of different spatial locations based on the coordinated multi-band signal patterns.

7. The system of claim 2, wherein, for the cross-correlation, the processor is further configured to determine phase relationships between signals detected in the plurality of different predetermined intermediate frequency bands across the plurality of wireless communication devices.

8. The system of claim 7, wherein the processor is further configured to identify, from the detected coordinated multi-band signal patterns, one or more spatially coordinated transmission patterns based on the determined phase relationships.

9. The system of claim 8, wherein the processor is further configured to classify the detected coordinated multi-band signal patterns and the one or more spatially coordinated transmission patterns as either legitimate multi-band operations or potential coordinated interference.

10. The system of claim 2, wherein the processor is further configured to compare the detected coordinated multi-band signal patterns against a pattern recognition database of known signal patterns.

11. The system of claim 10, wherein the processor is further configured to identify previously unknown relationships between signals detected across the plurality of different predetermined intermediate frequency bands and the plurality of different spatial locations.

12. The system of claim 11, wherein the processor is further configured to adjust pattern detection parameters based on the identified previously unknown relationships between the signals detected across the plurality of different predetermined intermediate frequency bands and the plurality of different spatial locations.

13. The system of claim 2, wherein the processor is further configured to generate threat assessments based on the detected coordinated multi-band signal patterns.

14. The system of claim 13, wherein the processor is further configured to control one or more wireless communication devices of the plurality of wireless communication devices trigger one or more operational responses based on the generated threat assessments.

15. The system of claim 2, wherein the processor is further configured to generate one or more radio frequency environment maps based on the detected coordinated multi-band signal patterns.

16. The system of claim 15, wherein the processor is further configured to identify, within the one or more radio frequency environment maps, spatial clusters of signal sources that operate across the plurality of different predetermined intermediate frequency bands.

17. The system of claim 16, wherein the processor is further configured to track movement of the signal sources identified across the plurality of different spatial locations.

18. The system of claim 1, wherein the plurality of different predetermined intermediate frequency bands comprises at least two of: 2.4 gigahertz (GHz) band, 5 GHz band, 6 GHz band, 7 GHz band, or an unlicensed frequency band.

19. A method for distributed spectrum monitoring, the method comprising:

in a central cloud server:

obtaining multi-link operation (MLO) data streams from a plurality of wireless communication devices distributed across a plurality of different spatial locations, wherein each wireless communication device of the plurality of wireless communication devices is configured to concurrently operate at a plurality of different predetermined intermediate frequency bands;

synchronizing the obtained MLO data streams from the plurality of wireless communication devices distributed across the plurality of different spatial locations;

performing a cross-correlation between the synchronized MLO data streams; and causing the plurality of wireless communication devices to maintain a synchronized timing reference across the plurality of wireless communication devices.

20. A computer program product for distributed spectrum monitoring, the computer program product comprising a non-transitory computer-readable storage medium having program instructions embodied therewith, the program instructions are executable by a system to cause the system to execute operations, the operations comprising:

obtaining multi-link operation (MLO) data streams from a plurality of wireless communication devices distributed across a plurality of different spatial locations, wherein each wireless communication device of the plurality of wireless communication devices is configured to concurrently operate at a plurality of different predetermined intermediate frequency bands;

synchronizing the obtained MLO data streams from the plurality of wireless communication devices distributed across the plurality of different spatial locations;

performing a cross-correlation between the synchronized MLO data streams; and causing the plurality of wireless communication devices to maintain a synchronized timing reference across the plurality of wireless communication devices.

* * * * *